US012284579B2

(12) United States Patent
El Essaili et al.

(10) Patent No.: US 12,284,579 B2
(45) Date of Patent: Apr. 22, 2025

(54) NETWORK INFORMATION DELIVERY TOWARDS APPLICATION AT DEVICE SIDE

(71) Applicant: Telefonaktiebolaget LM Ericsson (publ), Stockholm (SE)

(72) Inventors: Ali El Essaili, Aachen (DE); Massimo Condoluci, Solna (SE); Thorsten Lohmar, Aachen (DE); Maciej Muehleisen, Eynatten (BE); Yunpeng Zang, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 415 days.

(21) Appl. No.: 17/766,007

(22) PCT Filed: Nov. 2, 2020

(86) PCT No.: PCT/EP2020/080689
§ 371 (c)(1),
(2) Date: Apr. 1, 2022

(87) PCT Pub. No.: WO2021/089484
PCT Pub. Date: May 14, 2021

(65) Prior Publication Data
US 2022/0329994 A1 Oct. 13, 2022

Related U.S. Application Data

(60) Provisional application No. 62/933,492, filed on Nov. 10, 2019.

(51) Int. Cl.
*H04W 4/44* (2018.01)
*H04W 4/021* (2018.01)
(Continued)

(52) U.S. Cl.
CPC ............. *H04W 4/44* (2018.02); *H04W 4/021* (2013.01); *H04W 24/08* (2013.01); *H04W 68/005* (2013.01)

(58) Field of Classification Search
None
See application file for complete search history.

(56) References Cited

U.S. PATENT DOCUMENTS

2018/0159935 A1* 6/2018 Cavalcanti ............. H04W 4/40
2019/0037516 A1* 1/2019 Kim ..................... H04W 60/005
(Continued)

FOREIGN PATENT DOCUMENTS

CN      111385746 A  *  7/2020  ......... H04L 12/1895
RU     2021111903 A  * 11/2022  ............. H04W 4/02
(Continued)

OTHER PUBLICATIONS

3GPP TS 23.286, v1.0.0, Mar. 14, 2019, XP051722770.*
(Continued)

*Primary Examiner* — Andrew C Oh
(74) *Attorney, Agent, or Firm* — Murphy, Bilak & Homiller, PLLC

(57) ABSTRACT

A V2X UE (e.g., wireless device) that includes a vehicle-to-everything (V2X) application enabler (VAE) client and a V2X application-specific client associated with a V2X application, where the V2X UE is connected with a V2X application server is enabled to receive notifications of conditions occurring in a wireless network that connects them. The V2X application-specific client in the UE performing a registration with the V2X application server for receiving notifications. The registration comprises one or more conditions monitored by a network function (NF) in the wireless network. For example, the condition can be related to QoS provided by the network in a particular geographic area
(Continued)

and/or in a particular time window, where the NF can be a network data and analytics function (NWDAF). The VAE client receives from the VAE server the notifications. The VAE client can receive a notification of a particular occurrence of the condition after the NF monitoring detects the occurrence.

14 Claims, 17 Drawing Sheets

(51) Int. Cl.
*H04W 24/08* (2009.01)
*H04W 68/00* (2009.01)

(56) References Cited

U.S. PATENT DOCUMENTS

| | | | | |
|---|---|---|---|---|
| 2019/0313359 | A1* | 10/2019 | Lee | H04W 76/14 |
| 2019/0349719 | A1* | 11/2019 | Pattan | H04W 4/40 |
| 2020/0092691 | A1* | 3/2020 | el Essaili | H04W 4/02 |
| 2020/0267517 | A1* | 8/2020 | el Essaili | H04L 61/4511 |

FOREIGN PATENT DOCUMENTS

| | | | | | |
|---|---|---|---|---|---|
| WO | WO-2019216738 | A1 | * | 11/2019 | H04W 4/12 |
| WO | WO-2020011350 | A1 | * | 1/2020 | H04W 48/18 |
| WO | WO-2020030424 | A1 | * | 2/2020 | G08G 1/16 |
| WO | WO-2020074112 | A1 | * | 4/2020 | H04W 4/02 |
| WO | WO-2020092742 | A1 | * | 5/2020 | H04W 4/40 |
| WO | WO-2020192934 | A1 | * | 10/2020 | H04L 41/082 |
| WO | WO-2020211953 | A1 | * | 10/2020 | H04W 16/22 |
| WO | 2021089312 | A1 | | 5/2021 | |

OTHER PUBLICATIONS

Huawei, "Pseudo-CR-Solution to V2X application authentication and authorization", 3GPP Draft; Sophio Antipolis, France Jul. 23-27, 2018, S6-181074.*
3GPP TS 23.286 v16.1.0 (Sep. 2019).*
"3GPP TS 23.286 V1.0.0", 3rd Generation Partnership Project; Technical Specification Group Services and System Aspects; Application layer support for V2X services; Functional architecture and information flows; (Release 16), Sep. 2019, pp. 1-26.
"3GPP TS 23.287 V16.0.0", 3rd Generation Partnership Project; Technical Specification Group Services and System Aspects; Architecture enhancements for 5G System (5GS) to support Vehicle-to-Everything (V2X) services (Release 16), Sep. 2019, pp. 1-49.
"3GPP TS 23.288 V16.0.0", 3rd Generation Partnership Project; Technical Specification Group Services and System Aspects; Architecture enhancements for 5G System (5GS) to support network data analytics services (Release 16), Jun. 2019, pp. 1-52.
"3GPP TS 23.434 V16.1.0", 3rd Generation Partnership Project; Technical Specification Group Services and System Aspects; Service Enabler Architecture Layer for Verticals (SEAL); Functional architecture and information flows; (Release 16), Sep. 2019, pp. 1-117.
"3GPP TS 23.503 V16.2.0", 3rd Generation Partnership Project; Technical Specification Group Services and System Aspects; Policy and Charging Control Framework for the 5G System (5GS); Stage 2 (Release 16), Sep. 2019, pp. 1-104.
"3GPP TS 23.682 V16.4.0", 3rd Generation Partnership Project; Technical Specification Group Services and System Aspects; Architecture enhancements to facilitate communications with packet data networks and applications (Release 16), Sep. 2019, pp. 1-133.
"3GPP TS 26.348 V16.2.0", 3rd Generation Partnership Project; Technical Specification Group Services and System Aspects; Northbound Application Programming Interface (API) for Multimedia Broadcast/Multicast Service (MBMS) at the xMB reference point (Release 16), Jun. 2019, pp. 1-46.
"3GPP TS 33.401 V15.9.0", 3rd Generation Partnership Project; Technical Specification Group Services and System Aspects; 3GPP System Architecture Evolution (SAE); Security architecture (Release 15), Sep. 2019, pp. 1-163.
"3GPP TS 23.502 V16.2.0", 3rd Generation Partnership Project; Technical Specification Group Services and System Aspects; Procedures for the 5G System (5GS); Stage 2 (Release 16), Sep. 2019, pp. 1-525.
"3GPP TS 23.501 V16.2.0", 3rd Generation Partnership Project; Technical Specification Group Services and System Aspects; System Architecture for the 5G System (5GS); Stage 2 (Release 16), Sep. 2019, pp. 1-391.
"Pseudo-CR on Solution to V2X application authentication and authorization", 3GPP TSG-SA WG6 Meeting #25, S6-181074 (revision of S6-18xxxx), Sophia Antipolis, France, Jul. 23-27, 2018, pp. 1-4.
"3GPP TS 23.285 V16.1.0", 3rd Generation Partnership Project; Technical Specification Group Services and System Aspects; Architecture enhancements for V2X services (Release 16), Sep. 2019, pp. 1-37.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

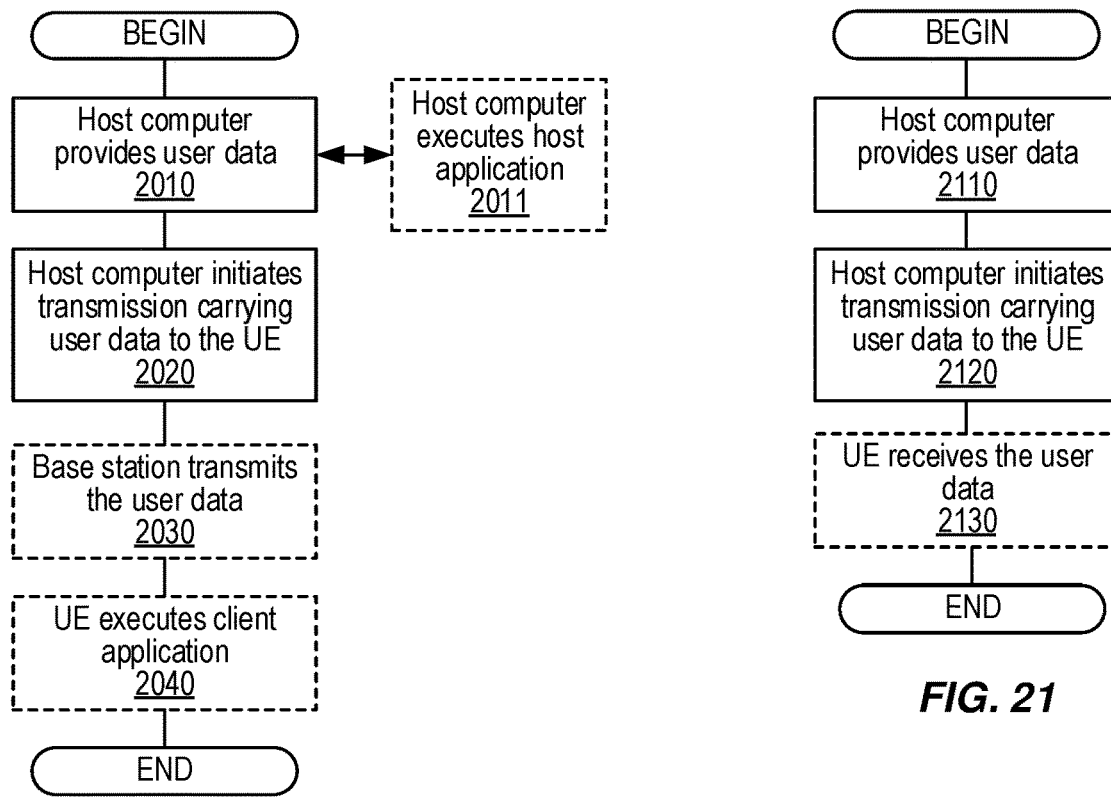
FIG. 20
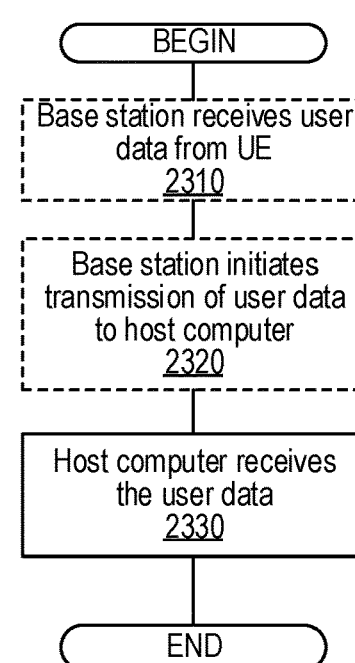
FIG. 21
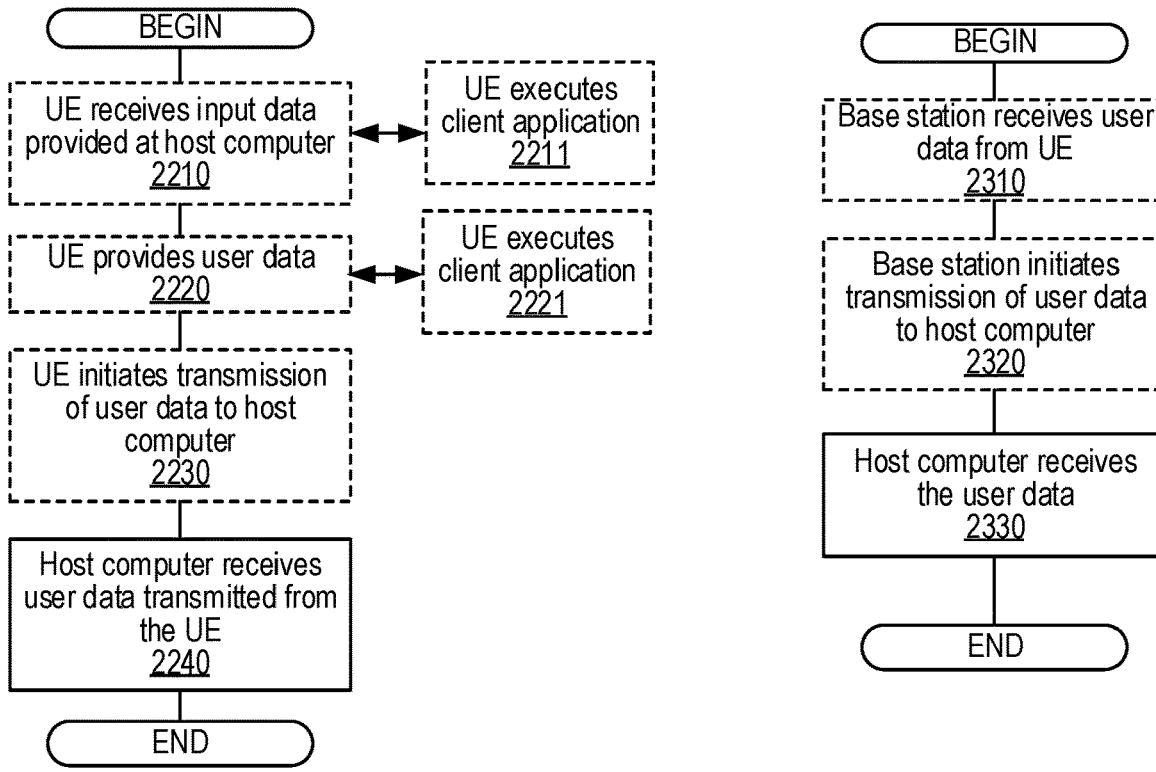
FIG. 22
FIG. 23

NETWORK INFORMATION DELIVERY TOWARDS APPLICATION AT DEVICE SIDE

TECHNICAL FIELD

The present application relates generally to the field of wireless communications, and more specifically to discovery and provision of intelligent transportation system (ITS) and/or vehicle-to-everything (V2X) services using device-to-device (D2D) unicast communication.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for Cooperative Intelligent Transportation Systems (C-ITS) applications, including road transport. Communication of vehicles with each other (vehicle-to-vehicle, or V2V), with infrastructure (V2I), and with vulnerable pedestrians (V2P) are expected to increase user safety and comfort, and to improve traffic management and/or reduce congestion, and to reduce vehicle fuel consumption and emissions. Collectively, these communication modes are commonly referred to as vehicle to everything (V2X). An extensive set of C-ITS use cases for V2X have been developed, and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard (TS) 23.285. In FIG. 1, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

FIG. 2 shows a more detailed V2X application layer functional model, which further specifies the functional entities. For example, the V2X AS includes a V2X application enabler (VAE) server, a V2X application-specific server, and Service Enabler Architecture Layer for Verticals (SEAL) server(s). The VAE server provides the V2X application layer support functions to the V2X application specific server over Vs reference point. The SEAL server(s) provide the VAE layer services such as location management, group management, configuration management, identity management, key management, and network resource management.

Similarly, each of the V2X UEs include a VAE client, a V2X application-specific client, and a SEAL client. The VAE client provides the V2X application layer support functions to the V2X application specific-client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE client interacts with SEAL clients over the SEAL-C reference point specified for each SEAL service. The VAE server interacts with SEAL servers over the SEAL-S reference point specified for each SEAL service. The interaction between the SEAL clients is supported by SEAL-PC5 reference point specified for each SEAL service. The interaction between a SEAL client and the corresponding SEAL server is supported by SEAL-UU reference point specified for each SEAL service. The SEAL-C, SEAL-S, SEAL-PC5, SEAL-UU reference points for each SEAL service are further specified in 3GPP TS 23.434. In some implementations, the client and server entities of SEAL can be part of VAE client and VAE server, respectively The VAE server interacts with 3GPP networks (e.g., Evolved Packet Subsystem (EPS) and/or 5G subsystem (5GS)) via the V2, T8, MB2-U, and xMB-U reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode. Similarly, the SEAL server interacts with 3GPP networks over the MB2-C, xMB-C, and Rx reference points.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

A V2X UE can support unicast communication via the radio interface (also referred to as "Uu") to a 3GPP radio access network (RAN), such as the LTE Evolved-UTRAN (E-UTRAN) or Next-Generation RAN (NG-RAN). A V2X UE can also support unicast over the PC5 interface, whereby UEs can communicate with each other directly (e.g., device-to-device or D2D) via "sidelink" rather than indirectly via the 3GPP RAN.

In order to support the decision processes of certain V2X applications, it is important that such applications have information about network (e.g., 3GPP network) capabilities in a certain geographical area and/or in a certain time window. Examples of such information include expected performance, predicted performance, and/or achievable quality of service (QoS) of the network within such areas or time windows. Such information could be used by a V2X application to select a certain geographical path (e.g., route) according to achievable network QoS along that path, and/or to adapt a vehicle's behavior according to expected network performance.

Even so, there are various problems and/or issues about how such network-related information can be provided to V2X applications in a timely and efficient manner.

SUMMARY

Accordingly, exemplary embodiments of the present disclosure address these and other difficulties relating to providing network-related information (e.g., geographic- or time-specific QoS) to V2X applications in a timely and efficient manner.

Some exemplary embodiments of the present disclosure include methods (e.g., procedures) for receiving notifications of conditions occurring in a wireless network. These exemplary methods can be performed by a V2X UE (e.g., wireless device) that includes a vehicle-to-everything (V2X) application enabler (VAE) client and a V2X application-specific client associated with a V2X application.

In some embodiments, these exemplary methods can include the V2X application-specific client in the UE performing a first registration with the VAE client in the UE for to receiving notifications, from the VAE client, of one or more conditions monitored by a network function (NF) in the wireless network. For example, the one or more conditions can be related to QoS provided by the network in a particular geographic area and/or in a particular time window. For example, the NF can be a network data and analytics function (NWDAF).

In some embodiments, performing the first registration can include the V2X application-specific client sending a first registration that includes various information, including any of the following:
an identity (ID) of the V2X application-specific client;
an ID of a V2X application-specific server to which notifications of the one or more conditions should be sent;
a V2X service ID;
an ID of a geographical area for which the notification of the one or more conditions is requested;
alternative quality-of-service (QoS) parameters for the V2X application; and
application flow description associated with data traffic for the V2X application in the wireless network.

In such embodiments, these exemplary methods can also include, in response to the first registration, the VAE client performing a second registration with a VAE server, coupled with the wireless network, for receiving notifications of the one or more conditions from the VAE server.

These exemplary methods can also include the VAE client receiving, from the VAE server, a first notification of a condition monitored by the NF. In other words, after having previously registered for such notifications, the VAE client can receive a notification of a particular occurrence of the condition after the NF monitoring detects the occurrence.

These exemplary methods can also include, in response to the first notification, the VAE client sending a second notification of the condition to the UE's V2X application-specific client. In other words, after having previously registered for such notifications, the V2X application-specific client can receive a notification of a particular occurrence of the condition after VAE client receives such a notification.

These exemplary methods can also include the UE's V2X application-specific client, in response to the second notification, adapting one or more operating parameters of the V2X application. For example, this can include adaptation of the application's behavior (e.g., data rate, data prioritization, etc.) and/or behavior of a vehicle (speed, path/route, etc.) that the V2X UE is associated with.

In some embodiments, the wireless network can include a 5G core network (5GC) and a next-generation radio access network (NG-RAN). In such embodiments, the first/second notifications can be one of the following: a QoS Change based on Extended NG-RAN Notification, and a Notification on QoS Sustainability Analytics.

Other exemplary embodiments of the present disclosure include methods (e.g., procedures) for notifying one or more VAE clients in respective user equipment (UEs) of conditions occurring in a wireless network. These exemplary methods can be performed by a VAE server associated with the one or more VAE clients.

In some embodiments, these exemplary methods can include registering a first one of the VAE clients to receive notifications, from the VAE server, of one or more conditions monitored by a network function (NF) in the wireless network. For example, the one or more conditions can be related to QoS provided by the network in a particular geographic area and/or in a particular time window. For example, the NF can be a NWDAF. The registering operations can include the following:
receiving a first registration request from the first VAE client for receiving notifications, from the VAE server, of the one or more conditions.
performing a second registration with the wireless network for receiving notifications, from the wireless network, of the one or more conditions.
sending a first registration response to the first VAE client indicating that the first VAE client is registered to receive the notifications of the one or more conditions.

In some embodiments, the first registration request can include one or more of the following:
an identity (ID) of a first V2X application-specific client associated with the first VAE client;
an ID of a V2X application-specific server to which notifications of the one or more conditions should be sent;
a V2X service ID;
an ID of a geographical area for which the notification of the one or more conditions is requested;
alternative quality-of-service (QoS) parameters for the V2X application; and
application flow description associated with data traffic for the V2X application in the wireless network.

In some of these embodiments, where the the first registration request includes the ID of the V2X application-specific server, the registering operations can also include sending the first registration response to the V2X application-specific server. For example, sending the first response in this manner can be based on the inclusion of the V2X application-specific server ID in the first request.

These exemplary methods can also include receiving, from the wireless network, a first notification of a condition monitored by a network function (NF) in the wireless network. For example, this first notification can be received after the VAE server registers with the wireless network for receiving notifications of the one or more conditions.

These exemplary methods can also include determining one or more VAE clients, in respective UEs, that are registered for receiving notification of the condition. These exemplary methods can also include sending, to the one or more registered VAE clients, a second notification of the condition.

In some embodiments, the one or more registered VAE clients are associated with respective V2X application-specific clients, and the V2X application-specific clients are associated with a V2X application-specific server. In such embodiments, these exemplary methods can also include sending the second notification of the condition to the V2X application-specific server. This can be done, for example, if the registered VAE client(s) provided an ID of the V2X application-specific server in a registration request.

In some embodiments, the wireless network can include a 5G core network (5GC) and a next-generation radio access network (NG-RAN). In such embodiments, the second notification can be one of the following: a QoS Change based on Extended NG-RAN Notification, and a Notification on QoS Sustainability Analytics.

Exemplary embodiments also include user equipment (UEs, e.g., V2X UEs, wireless devices, etc.) or VAE servers configured to perform operations corresponding to any of the exemplary methods described herein. Exemplary embodiments also include non-transitory, computer-readable media storing computer-executable instructions that, when executed by processing circuitry of a UE or a VAE server, configure the UE or VAE server to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 20-23 are flow diagrams of exemplary methods and/or procedures for transmission and/or reception of user data, according to various exemplary embodiments of the present disclosure.

DETAILED DESCRIPTION

Figure 1:
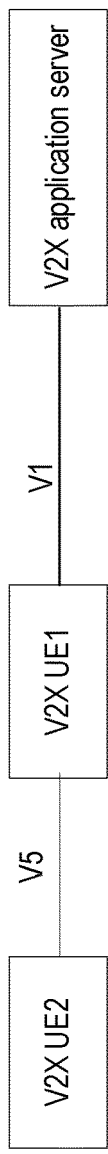
FIG. 1 shows a simplified architectural model for the V2X application layer as specified in 3GPP TS 23.285.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

Radio Node: As used herein, a "radio node" can be either a "radio access node" or a "wireless device."

Radio Access Node: As used herein, a a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, it is important that V2X applications have information about network (e.g., 3GPP network) capabilities in a certain geographical area and/or in a certain time window. Examples of such information include expected performance, predicted performance, and/or achievable quality of service (QoS) of the network within such areas or time windows. Such information could be used by a V2X application to select a certain geographical path (e.g., route) according to achievable network QoS along that path, and/or to adapt a vehicle's behavior according to expected network performance. Even so, there are various problems and/or issues about how such network-related information can be provided to V2X applications in a timely and efficient manner. These are discussed in more detail below.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

Figure 3:
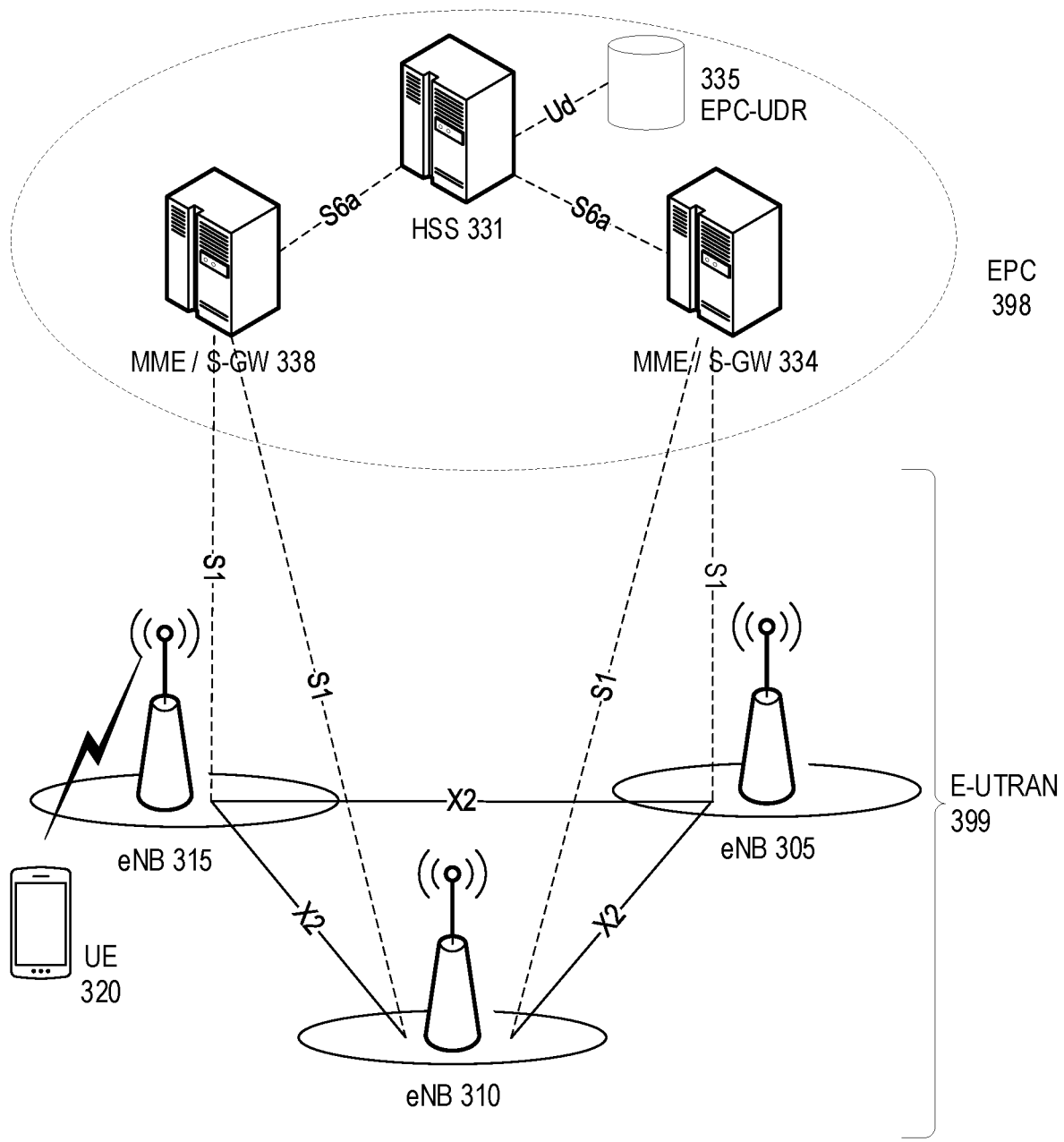
FIG. 3 shows a high-level view of an exemplary LTE network architecture.

An overall exemplary architecture of a network comprising LTE and SAE is shown in FIG. 3. E-UTRAN 399 includes one or more evolved Node B's (eNB), such as eNBs 305, 310, and 315, and one or more user equipment (UE), such as UE 320. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP radio access networks are commonly known.

As specified by 3GPP, E-UTRAN 399 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 305, 310, and 315. The eNBs in the E-UTRAN communicate with each other via the X1 interface, as shown in FIG. 3. The eNBs also are responsible for the E-UTRAN interface to the EPC 330, specifically the S1 interface to the Mobility Management Entity (MME) and the Serving Gateway (SGW), shown collectively as MME/S-GWs 334 and 338 in FIG. 3. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 305, 310, and 315.

EPC 330 can also include a Home Subscriber Server (HSS) 331, which manages user- and subscriber-related information. HSS 331 can also provide support functions in mobility management, call and session setup, user authentication and access authorization. The functions of HSS 331 can be related to the functions of legacy Home Location Register (HLR) and Authentication Centre (AuC) functions or operations.

In some embodiments, HSS 331 can communicate with a user data repository (UDR)—labelled EPC-UDR 335 in FIG. 3—via a Ud interface. The EPC-UDR 335 can store user credentials after they have been encrypted by AuC algorithms. These algorithms are not standardized (i.e., vendor-specific), such that encrypted credentials stored in EPC-UDR 335 are inaccessible by any other vendor than the vendor of HSS 331.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Figure 4:
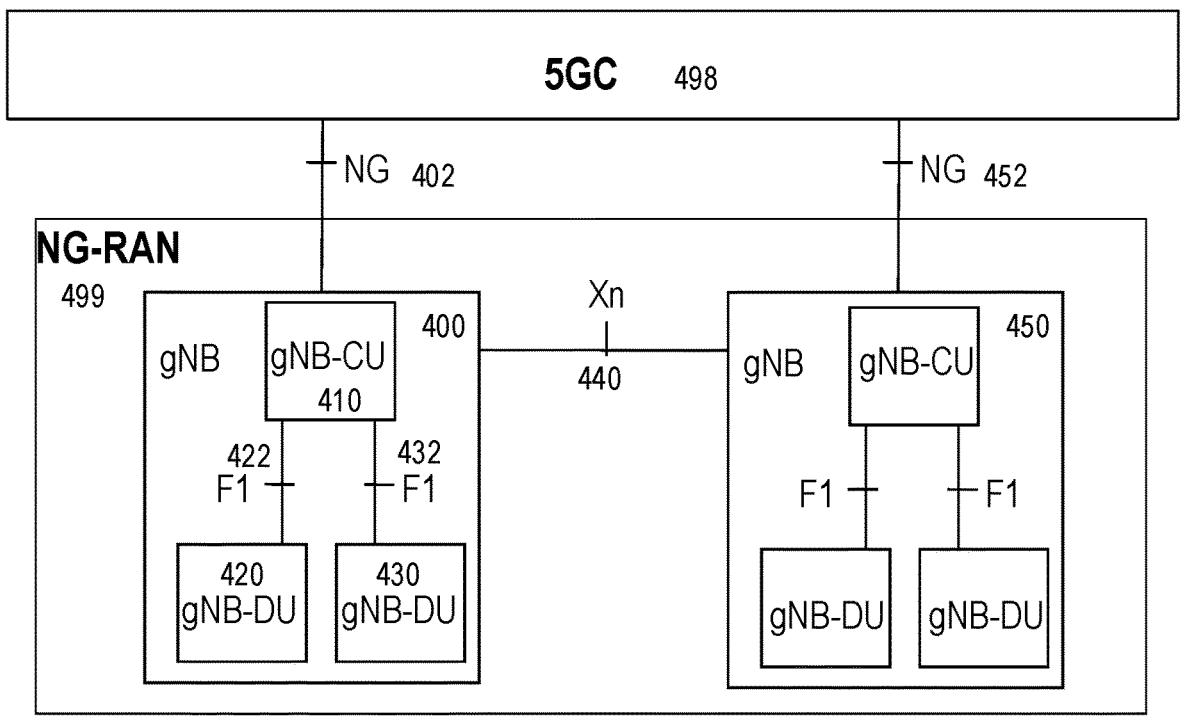
FIGS. 4-5 show two high-level view of an exemplary 5G network architecture.
Figure 5:
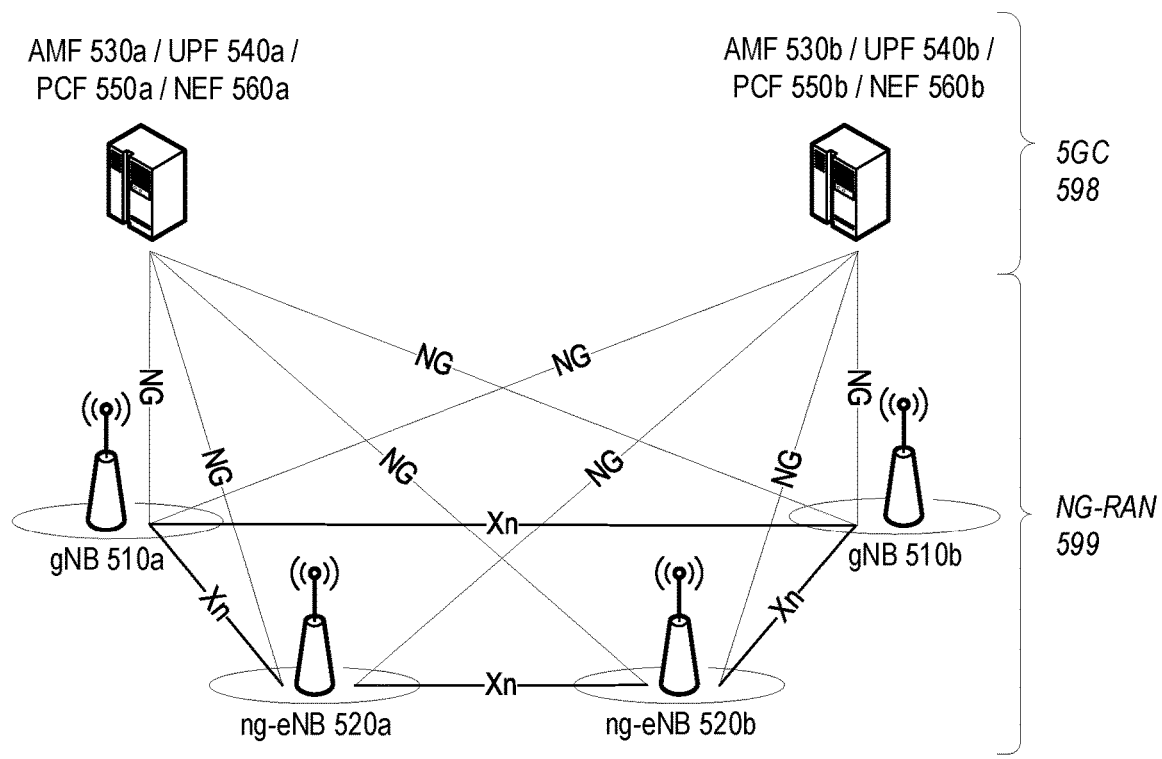

FIG. 4 shows a high-level view of an exemplary 5G network architecture, including a Next Generation RAN (NG-RAN) 499 and a 5G Core (5GC) 498. NG-RAN 499 can include one or more gNodeB's (gNBs) connected to the 5GC via one or more NG interfaces, such as gNBs 400, 450 connected via interfaces 402, 452, respectively. More specifically, gNBs 400, 450 can be connected to one or more Access and Mobility Management Functions (AMF) in the 5GC 498 via respective NG-C interfaces. Similarly, gNBs 400, 450 can be connected to one or more User Plane Functions (UPFs) in 5GC 498 via respective NG-U interfaces.

Although not shown, in some deployments 5GC 498 can be replaced by an Evolved Packet Core (EPC), which conventionally has been used together with LTE E-UTRAN. In such deployments, gNBs 400, 450 can connect to one or more Mobility Management Entities (MMES) in EPC 498 via respective S1-C interfaces. Similarly, gNBs 400, 450 can connect to one or more Serving Gateways (SGWs) in EPC via respective NG-U interfaces.

In addition, the gNBs can be connected to each other via one or more Xn interfaces, such as Xn interface 440 between gNBs 400 and 450. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 4 (and described in 3GPP TS 38.401 and 3GPP TR 38.801) include a Central Unit (CU or gNB-CU) and one or more Distributed Units (DU or gNB-DU). For example, gNB 400 includes gNB-CU 410 and gNB-DUs 420 and 430. CUs (e.g., gNB-CU 410) are logical nodes that host higher-layer protocols and perform various gNB functions such controlling the operation of DUs. A DU (e.g., gNB-DUs 420, 430) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 422 and 432 shown in FIG. 4. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 6:
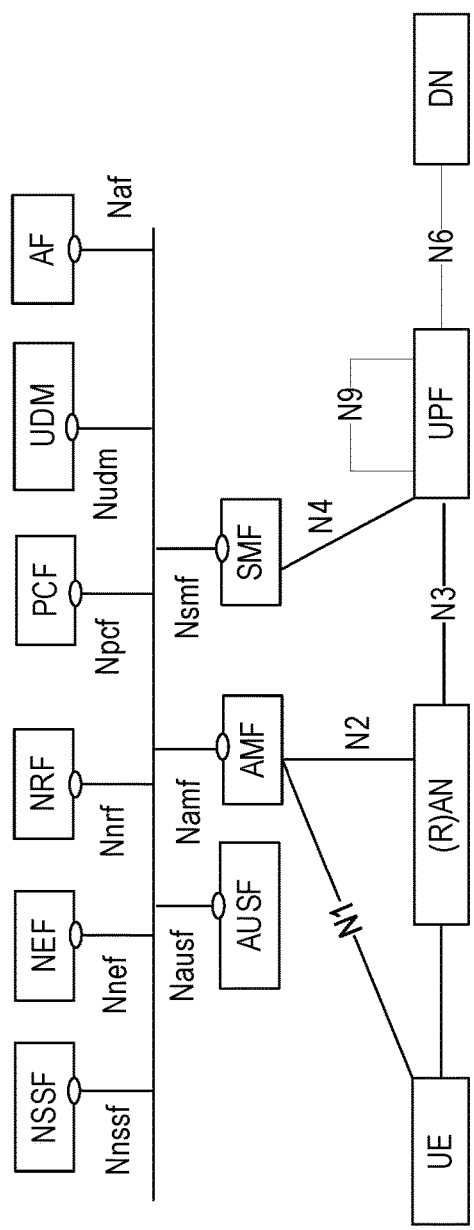
FIG. 6 shows an exemplary non-roaming 5G reference architecture with service-based interfaces and various 3GPP-defined network functions (NFs) in the control plane.

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 6 shows an exemplary non-roaming 5G reference architecture with service-based interfaces and various 3GPP-defined NFs within the Control Plane (CP). These include the following NFs, with additional details provided for those most relevant to the present disclosure:

Access and Mobility Management Function (AMF) with Namf interface—terminates the RAN CP interface and handles all mobility and connection management of UEs (similar to MME in EPC);

Session Management Function (SMF) with Nsmf interface—interacts with the decoupled user (or data) plane, including creating, updating, and removing Protocol Data Unit (PDU) sessions and managing session context with the User Plane Function (UPF), e.g., for event reporting;

User Plane Function (UPF) with Nupf interface—supports handling of user plane traffic based on the rules received from SMF, including packet inspection and different enforcement actions (e.g., event detection and reporting);

Policy Control Function (PCF) with Npcf interface—supports unified policy framework to govern the network behavior, e.g., via providing PCC rules to the SMF;

Network Exposure Function (NEF) with Nnef interface—acts as the entry point into operator's network, by securely exposing to AFs the network capabilities and events provided by 3GPP NFs and by providing ways for the AF to securely provide information to 3GPP network;

Network Repository Function (NRF) with Nnrf interface;

Network Slice Selection Function (NSSF) with Nnssf interface;

Authentication Server Function (AUSF) with Nausf interface;

Application Function (AF) with Naf interface—interacts with the 3GPP CN to provision information to the network operator and to subscribe to certain events happening in operator's network;

Network Data Analytics Function (NWDAF) (not shown); and

Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

3GPP Rel-15 also specifies a Network Data Analytics Function (NWDAF) including services (referred to as "Nnwdaf") that facilitate basic policy and network slicing control based on analytics information, which can include statistical information of the past events and/or predictive information. 3GPP Rel-16 enhances the Rel-15 analytics architecture and services based on a new 3GPP TS 23.288 (v16.0.0). Different NWDAF instances may be present in the 5GC, with possible specializations per categories of analytics. The capabilities of a particular NWDAF instance are described in the NWDAF profile stored in the NRF. In addition, various other NFs provide specific services in support of the NWDAF.

In the present disclosure, the term "service" is used generally to refer to a set of data, associated with one or more applications, that is to be transferred via a network with certain specific delivery requirements that need to be fulfilled in order to make the applications successful. In the present disclosure, the term "component" is used generally to refer to any component needed for the delivery of the service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", a term used generally to refer to an entity that can collect historical information about utilization of resources as well as provide information about the current and the predicted future availability of resources associated with that component (e.g., a RAN manager).

Figure 7:
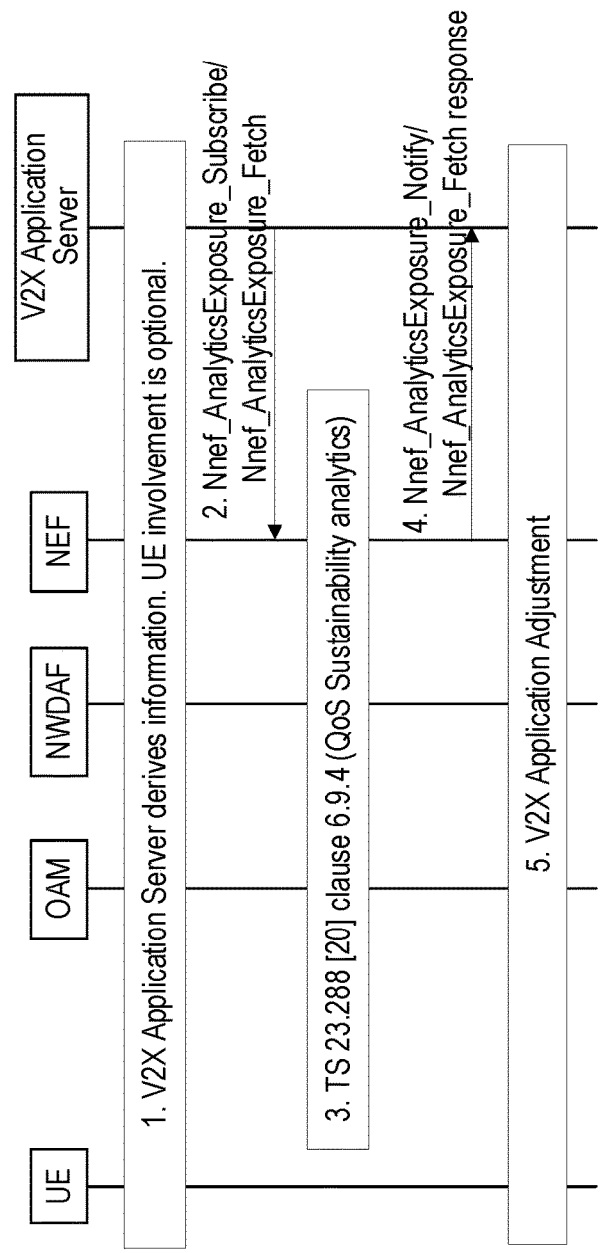
FIG. 7 shows a flow diagram of an exemplary procedure for notification of potential QoS change from the NWDAF to a V2X application server.

3GPP investigated how to enhance the knowledge of applications about network state and performance considering V2X applications in 3GPP TS 23.287. For example, 3GPP TS 23.287 (clause 6.4.1) defines a "procedure for notification on potential QoS change to the V2X Application Server," which is based on a "procedure for QoS Sustainability Analytics" defined in 3GPP TS 23.288 (clause 6.9). The consumer of QoS Sustainability analytics may request the NWDAF analytics information regarding the QoS change statistics in a certain area for an observation period in the past or the likelihood of a QoS change for an observation period in the future. FIG. 7 shows a flow diagram of an exemplary procedure for notification of potential QoS change from the NWDAF to a V2X application server. This procedure also involves a UE (e.g., a V2X UE), an operations/administration/maintenance (OAM) function or server, and a network exposure function (NEF).

Of particular interest to present disclosure are operations 4 and 5 in FIG. 7. In operation 4, if the network NEF receives the response from the NWDAF, the NEF notifies the V2X application server with the analytics information on potential QoS change by invoking Nnef_AnalyticsExposure_Notify service operation for a Subscribe-Notify model (as defined in 3GPP TS 23.288 clause 6.1.1.2) or Nnef_AnalyticsExposure_Fetch service operation for a Request-Response model (as defined in 3GPP TS 23.288 clause 6.1.2.2). In operation 5, a V2X application adjustment may take place. Note that the backend V2X application server (which in this example acts as an AF, discussed above) is notified with the information about the QoS change, while the UE is not.

3GPP TS 23.287 (clause 5.4.5.3) defines another "procedure for QoS Change based on Extended NG-RAN Notification to support Alternative Service Requirements, which is based on the extended notification control mechanism of NG-RAN defined in 3GPP TS 23.501, 23.502, and 23.503. This procedure is related to sessions with required QoS, as defined in 3PP TS 23.503 (clause 6.1.3.22).

More specifically, if an application function (AF) session can adjust to different QoS parameter combinations, the AF may provide Alternative Service Requirements containing one or more QoS reference parameters in a prioritized order (which indicates the preference of the QoS requirements with which the service can operate). The first QoS reference parameter in the Alternative Service Requirements reflects the QoS requirement of highest priority for the AF session and can contain the same QoS reference parameter that was provided together with the service information.

Furthermore, during the lifetime of the AF session, the QoS parameter combination that is provided for the service can change (e.g, due to AF decision or upon notification that QoS targets can no longer be fulfilled) and the first QoS reference parameter in the Alternative Service Requirements is then indicating the interest of the AF to return to the QoS requirements of highest priority as soon as possible.

When the PCF authorizes the service information from the AF and generates a PCC rule, it should also derive Alternative QoS parameter sets for this PCC rule based on the QoS reference parameters in the Alternative Service Requirements. The PCF should enable QoS Notification Control and include the derived Alternative QoS parameter sets (in the same prioritized order indicated by the AF) in the PCC rule sent to the SMF.

The Notification Control is also defined in 3GPP TS 23.501 (clause 5.7.2.4), and can be explained as follows. If the NG-RAN has received Alternative QoS profile(s) for this QoS Flow and supports the Alternative QoS profile handling, the NG-RAN shall, before sending a notification that the GFBR can no longer be guaranteed towards the SMF, check whether the values of the GFBR, the PDB and the PER parameters that the NG-RAN can guarantee match any of the Alternative QoS profile(s), and if there is a match, the NG-RAN should indicate the reference to the Alternative QoS profile(s) together with the notification to the SMF. Upon receiving a notification from the NG-RAN that the GFBR can no longer be guaranteed, the SMF may forward the notification to the PCF. The 5GC may initiate N2 signalling to modify or remove the QoS Flow.

As explained in 3GPP TS 23.503 (clause 6.2.3), the Notification Control generated from the NG-RAN can be exposed towards the AF. For example, the AF may subscribe in the PCF to receive notifications when the QoS targets can no longer (or can again) be fulfilled for a particular media flow. At the time the PCF gets notified that the GFBR can no longer (or can again) be guaranteed for a PCC rule, the PCF notifies to the AF the affected media and provides the indication that the QoS targets can no longer (or can again) be fulfilled. Note that again in this case, the AF (e.g., a backend V2X application server) is notified with the information about the QoS change, while the UE is not.

Figure 8:
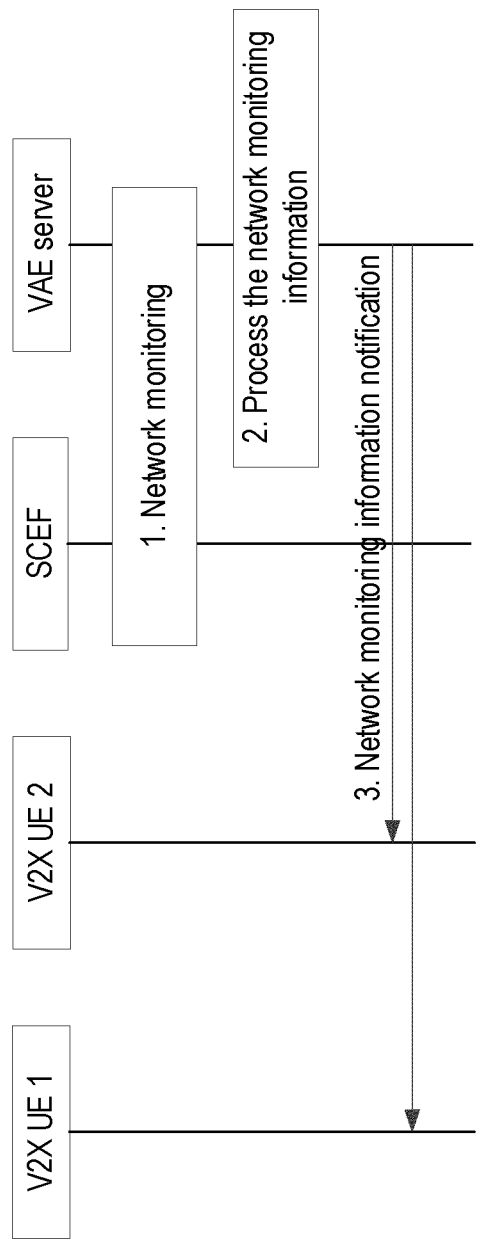
FIG. 8 shows an exemplary procedure for notification of 3GPP network (e.g., 5GC and/or NG-RAN) monitoring information to a VAE server.

Notification functionality is also available in the VAE server, such as the notifications for network monitoring information, defined in 3GPP TS 23.286 (clause 9.7.4) and depicted by the flow diagram shown in FIG. 8. One precondition for the operations shown in FIG. 8 is that the VAE server acting as a SCS/AS is configured with the SCEF information and is authorized to exchange information with the SCEF as specified in 3GPP TS 23.682 (clause 4.9). Another precondition is that V2X UE1 and V2X UE2 have subscribed for the network monitoring information at the VAE server.

In operation 1 of FIG. 8, the VAE server communicates with the SCEF to receive network monitoring information as per the procedure in 3GPP TS 23.682 (clause 4.9). In operation 2, the monitoring information (e.g. uplink or downlink link degradations, congestions, overload, etc.) available at the VAE server about the on-going V2X session(s) is based on the original network monitoring information provided by the SCEF in operation 1. In operation 3, the monitoring information is sent to the subscribed V2X UEs via network monitoring information notification.

Depending on the application, use case, and/or implementation, different sides of the application (i.e., vehicle/UE or backend/AF) may be able to utilize the information exposed by the network. For some V2X applications or use cases, it is the backend side that can exploit the information exposed by the network to adjust its behavior (data rate adaptation, data prioritization, etc.) and/or to adapt the behaviour of the vehicle (speed, path selection, etc.). In other V2X applications or use cases, it may be the application at device side (e.g., vehicle) that is capable of adjusting the behavior of the application and/or of adapting the behavior of the vehicle. So, from this point of view, it is important that relevant network information or notifications could be made available to both sides of the application as needed.

Current procedures in 3GPP TS 23.287 define how network information and/or notifications are exposed towards the backend side. In particular, and as a general approach for information/notifications generated by NFs, such information and/or notifications are intended to be consumed by other NFs, or by an AF. The AF has an interface towards the application backend whereby it can provide such notifications and/or information. Even so, exposure of the information and/or notifications towards the application at device side it is left to application implementation. This means that there is no a standardized way of delivering information and/or notifications that are generated by NFs in the core network to a device.

In addition, the application at the backend side is always involved in the path of delivery of network information and/or notifications towards the application at the device, even if the backend side is not involved in the task of reacting to (e.g., making adjustments based on) such information and/or notifications. This unnecessary involvement of the backend (e.g., the AF) may increase latency in the device receiving such information and/or notifications.

Note that the "network information and/or notifications" discussed herein are generally not the type of information that is customarily sent to the device by the network via radio resource control (RRC) or non-access-stratum (NAS) signaling, such as access network bitrate recommendation (ANBR) information. Rather, it generally refers to results of higher-level montoring operations that are produced certain NFs and distributed to subscribing NFs (or AFs), but not to UEs.

Figure 2:
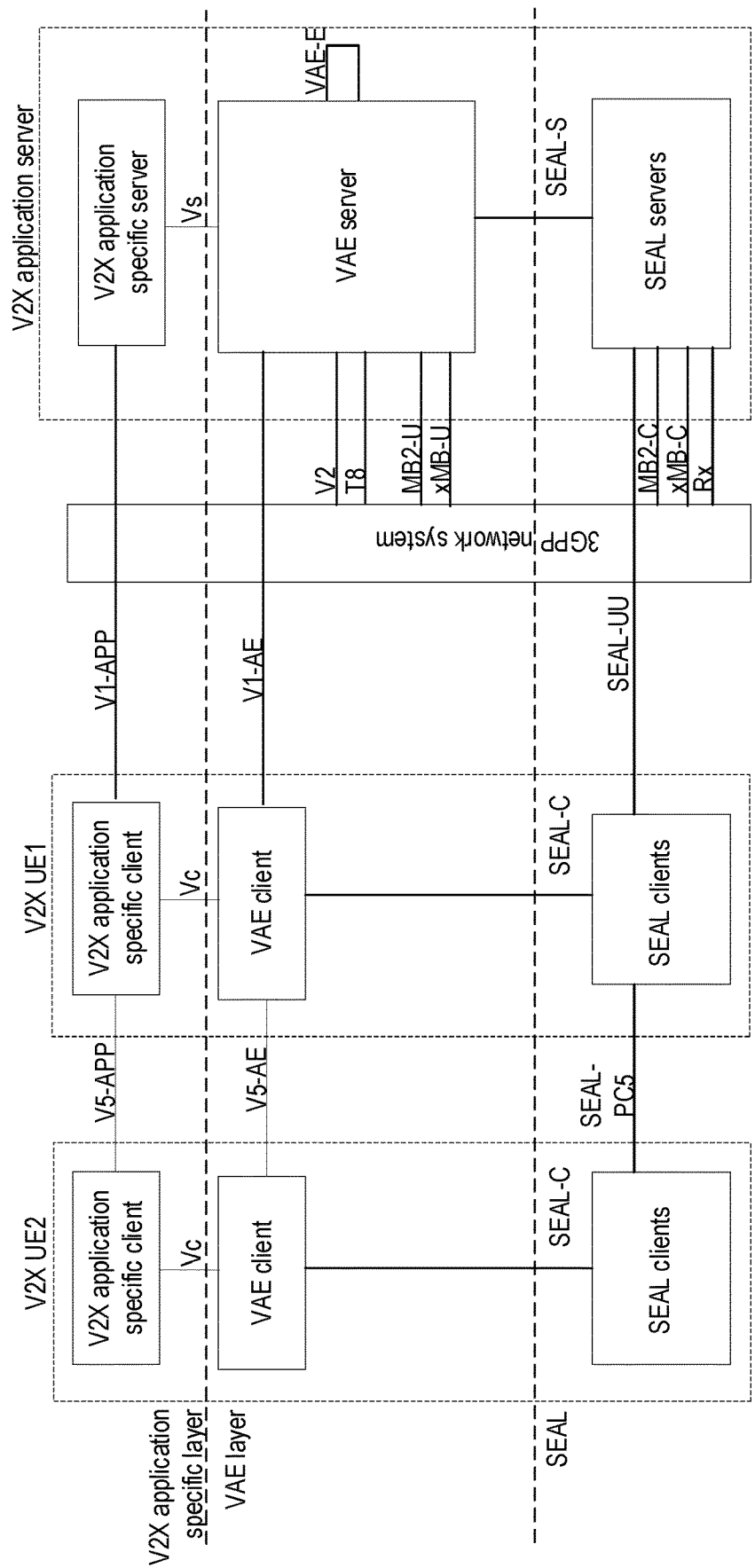
FIG. 2 shows a more detailed V2X application layer functional model.

The VAE server/client architecture defined in 3GPP TS 23.286 and illustrated in FIG. 2 may represent a viable baseline for providing a standardized way of delivering information/notifications which are generated by network functions in the core network towards the device side. From this point of view, however, one problem is that current specifications for VAE cover only a limited part of information and/or notifications exposed by the network. Other proposals have addressed how to register to procedures for QoS Sustainability Analytics and for QoS Change based on Extended NG-RAN Notification at the backend. Even so, such proposals did not address how such notifications can be delivered from the VAE server to application server/client, nor supporting interfaces in the device between the VAE client and the V2X application-specific client.

Exemplary embodiments of the present disclosure address these and other problems, drawbacks, and/or issues by providing techniques for delivering network information and/or notifications to the application at device side and at backend side by using standardized 3GPP mechanisms. Embodiments also include techniques for facilitating device-side applications to register to receive network information and/or notifications. For example, a VAE client can register to a VAE server for receiving network information and/or notifications, while a V2X application-specific client can trigger a registration to network information and/or notifications by using the VAE client. The information included in the registration of the V2X application-specific client is used by the VAE server/client to tune the notification process towards the relevant consumers. When network information and/or notifications are made available by NFs to the VAE server (which acts as an AF towards the 5GC), the VAE server functionality is extended to process and deliver such information to the relevant VAE server and VAE client, which then processes and delivers such information to the relevant V2X application-specific client.

Such embodiments provide various exemplary advantages. For example, such embodiments offer standardized means for delivering network notifications (e.g., on QoS Sustainability Analytics and on QoS Change based on Extended NG-RAN Notification) towards an application at the device side. This avoids using application-specific implementations and facilitates the creation of a common V2X framework for retrieve network information and/or notifications that does not depend on network-specific implementation. This can facilitate improved availability and support for such useful notification features. Furthermore, by avoiding going through the V2X application-specific server, such embodiments shorten the delivery path for notifications towards the application at device side, which can reduce latency and improve performance of various V2X applications.

Exemplary embodiments are described below in terms of the exemplary VAE framework shown in FIG. 2. Within this framework, at least for purposes of the present disclosure, a VAE server acts as an AF towards NFs in the core. If trusted, the AF can be configured with the NWDAF and PCF information and can be authorized to exchange information with the NWDAF and PCF. If the AF is untrusted, however, the AF can be configured with the NEF information and can be authorized to exchange information with the NEF, which then interacts with NWDAF and PCF.

Furthermore, at least for purposes of the present disclosure, the VAE client can be configured with the VAE server information and can be authorized to exchange information with the VAE server. Likewise, the V2X application-specific server/client can be configured with the VAE server/client information and can be authorized to exchange information with the VAE server/client. In addition, a V2X application-specific client can be associated with different VAE clients, and a V2X application-specific server can be associated with different VAE servers.

In various embodiments, the capabilities of the VAE framework shown in FIG. 2 can be extended with various methods (e.g., procedures). In some embodiments, these extensions can include a method (e.g., procedure) for Client registration to Notification on QoS Sustainability Analytics at the device, which can be used by a V2X application-specific client to register to a VAE client (e.g., at the device) for receiving Notification on QoS Sustainability Analytics. Such embodiments can include the following:

The VAE client can be extended with an application programming interface (API) V2X_Application_Specific_Client_Registration_Notification_on_QoS_Sustainability_Analytics, used by a V2X application-specific client to register for receiving Notification on QoS Sustainability Analytics.

A procedure VAE Client registration Notification on QoS Sustainability Analytics can be introduced between the VAE server and the VAE client, used by a VAE client to register to the VAE server for receiving Notification on QoS Sustainability Analytics.

Figure 9:
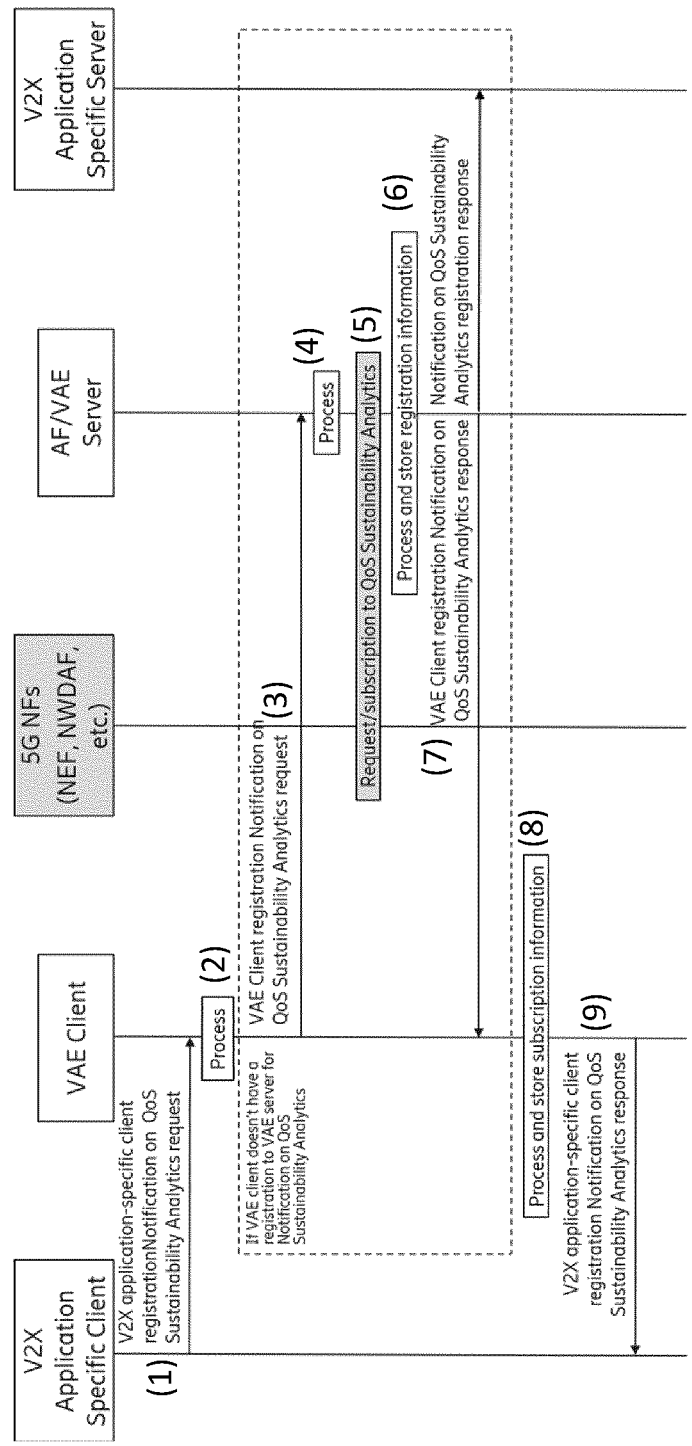
FIG. 9 shows a flow diagram illustrating an exemplary procedure for Client registration to Notification on QoS Sustainability Analytics, according to various exemplary embodiments of the present disclosure.

FIG. 9 shows a flow diagram illustrating an exemplary procedure for Client registration to Notification on QoS Sustainability Analytics, according to these exemplary embodiments. Various operations in FIG. 9 are given numerical labels. Unless expressly stated to the contrary, however, these numerical labels are not intended as a strict order of the operations in FIG. 9, but merely are used to facilitate the following explanation of such operations.

In operation 1, a V2X application-specific client (i.e., in the device) uses the above-mentioned V2X_Application_Specific_Client_Registration_Notification_on_QoS_Sustainability_Analytics API to send a V2X application-specific client registration Notification on QoS Sustainability Analytics request to the VAE client (i.e, in the device). This message can include, but is not limited to, the following information:

- V2X application-specific client ID (possibly implicit, e.g. the V2X application-specific client instantiates an VAE client). ID of the V2X application-specific client for receiving QoS Sustainability Analytics notifications. Alternatively, the V2X application specific client provides a notification end-point.
- V2X application-specific server ID. If included, it indicates whether QoS Sustainability Analytics notifications should be notified to V2X application-specific server in addition to the V2X application-specific client. The V2X application-specific client can also indicate whether the V2X application-specific server should receive the same notification as the V2X application-specific client (i.e., the same information) or only informing the V2X application-specific server that a notification towards the V2X application-specific client has been sent.
- V2X service ID. If included, it indicates the V2X service ID for which the V2X application-specific client registers to receive notifications.
- GEO ID. The geographical area to which the V2X application-specific client registers to.
- Analytics Filter Information. This field includes QoS requirements, Location information (e.g., travelling route in the form of a list of waypoints), Observation period, Threshold(s), S-NSSAI.
- Application flow description (explicit or implicit): This information helps the network to identify the application specific traffic flow in the network. This may be an SNI or a 5-Tuple. When the VAE client is managing the transport connections (Layer 4) on behalf of the application-specific client, then only a hint or a flag may be present and the VAE client will fill in the detailed information.

In operation 2, the VAE client processes the request received by the V2X application-specific client. For example, the VAE client can check whether it has an already-active registration to the VAE server for QoS Sustainability Analytics that matches the information included in the received request. Note that in general, a VAE client may exactly only associated with a single V2X application-specific client and an additional "UE internal" function may coordinate across different applications. Multiple applications are sharing the same communication channel and applications are often "shielded" against each other.

Another example of processing in operation 2 is for the VAE client to check whether it may have information that the QoS Sustainability Analytics is not supported in geographical area associated to the GEO ID included in the request. In these cases, the VAE client doesn't contact the VAE server and moves directly to the final processing before sending a response to the V2X application-specific client.

In operation 3, if required, the VAE client uses the procedure VAE Client registration Notification on QoS Sustainability Analytics to register to the VAE server for receiving Notification on QoS Sustainability Analytics. This is performed by the VAE client by sending a VAE Client registration Notification on QoS Sustainability Analytics request to the VAE server. The VAE client may perform a translation of information from the request received by the V2X application-specific client before sending the request to the VAE server (e.g., translation of GEO ID or translation of Analytics Filter Information or translation of Application flow description). In genera, the procedure for VAE Client registration Notification on QoS Sustainability Analytics of the VAE client to VAE server can be also independent of a request received by a V2X application-specific client. In other words, the VAE client may perform the procedure VAE Client registration Notification on QoS Sustainability Analytics without this being triggered by a request of a V2X application-specific client.

In operation 4, the VAE server processes the request received from the VAE client. For example, the VAE server can check whether it has an already-active registration to QoS Sustainability Analytics that matches the information included in the received request. Another example of processing is for the VAE server to check whether it may have information that the QoS Sustainability Analytics is not supported in geographical area associated to the GEO ID included in the request. In these cases, the VAE server doesn't trigger the request/subscription to QoS Sustainability Analytics towards the relevant functions in the core network and moves directly to the final processing before sending a response to the VAE client.

In operation 5, if the VAE server has to request/establish QoS Sustainability Analytics with the 3GPP CN, it triggers a request/subscription to QoS Sustainability Analytics towards the NEF/NWDAF as defined by 3GPP TS 23.288 (clause 6.9.4). More specifically, it uses the Analytics Filter Information and the Application flow description included in the request received by the VAE client, adequately translated if needed.

In operation 6, the VAE server performs a final processing taking into account the output of the request/subscription to QoS Sustainability Analytics. In case the request from the VAE client can be successfully handled (i.e., request/subscription to QoS Sustainability Analytics towards the NEF/NWDA is successful or there is an already active subscription to QoS Sustainability Analytics), the VAE server stores registration information. For example, the VAE server can add the VAE client to the list of VAE clients to whom the QoS Sustainability Analytics notification should be provided. If indicated in the request, the VAE server also stores the registration information that QoS Sustainability Analytics notification should be provided also to the V2X application-specific server. In this case, based on the field V2X application-specific server ID of the request, the VAE server stores the information whether the VAE server should receive the same notification as the one sent to VAE client (i.e., same content adequately translated) or only the information that a notification towards the VAE client has been triggered.

In operation 7, the VAE server uses the VAE Client registration Notification on QoS Sustainability Analytics procedure to send a VAE Client registration Notification on QoS Sustainability Analytics response to the VAE client indicating the acceptance/rejection of the request. If indicated in the request, the VAE server sends a Notification on QoS Sustainability Analytics registration response to relevant V2X application-specific server. In this case, the V2X application-specific server which has to receive the response may be explicitly indicated in the request or it may be that the VAE server has an understanding of which V2X application-specific server to send the response to according to other available information/mapping at the VAE server (e.g., stored relationship between VAE client and V2X application-specific server).

In operation 8, the VAE client performs a final processing, taking into account the response from the VAE server if necessary. In case the request from the V2X application-specific client can be successfully handled (i.e., successful response received from the VAE server or there is an already active registration to QoS Sustainability Analytics), the VAE client stores registration information, e.g., adding the V2X application-specific client to the list of V2X application-specific clients to whom the QoS Sustainability Analytics notification should be provided.

In operation 9, the VAE client uses the V2X_Application_Specific_Client_Registration_Notification_on_QoS_Sustainability_Analytics API to send a V2X application-specific client registration Notification on QoS Sustainability Analytics response to the V2X application-specific client indicating the acceptance/rejection of the request.

In some embodiments, these extensions of the VAE framework shown in FIG. 2 can include a method (e.g., procedure) for Client registration to QoS Change based on Extended NG-RAN Notification at the device, which can be used by a V2X application-specific client to register to VAE client for receiving QoS Change based on Extended NG-RAN Notification. Such embodiments can include the following:

The VAE client can be extended with the API V2X_Application_Specific_Client_Registration_QoS_Change_based_on_Extended_NG-RAN_Notification, used by a V2X application-specific client to register for receiving QoS Change based on Extended NG-RAN Notification.

A procedure VAE client registration QoS Change based on Extended NG-RAN Notification request can be introduced between the VAE server and the VAE client, used by a VAE client to register to the VAE server for receiving QoS Change based on Extended NG-RAN Notification.

Figure 10:
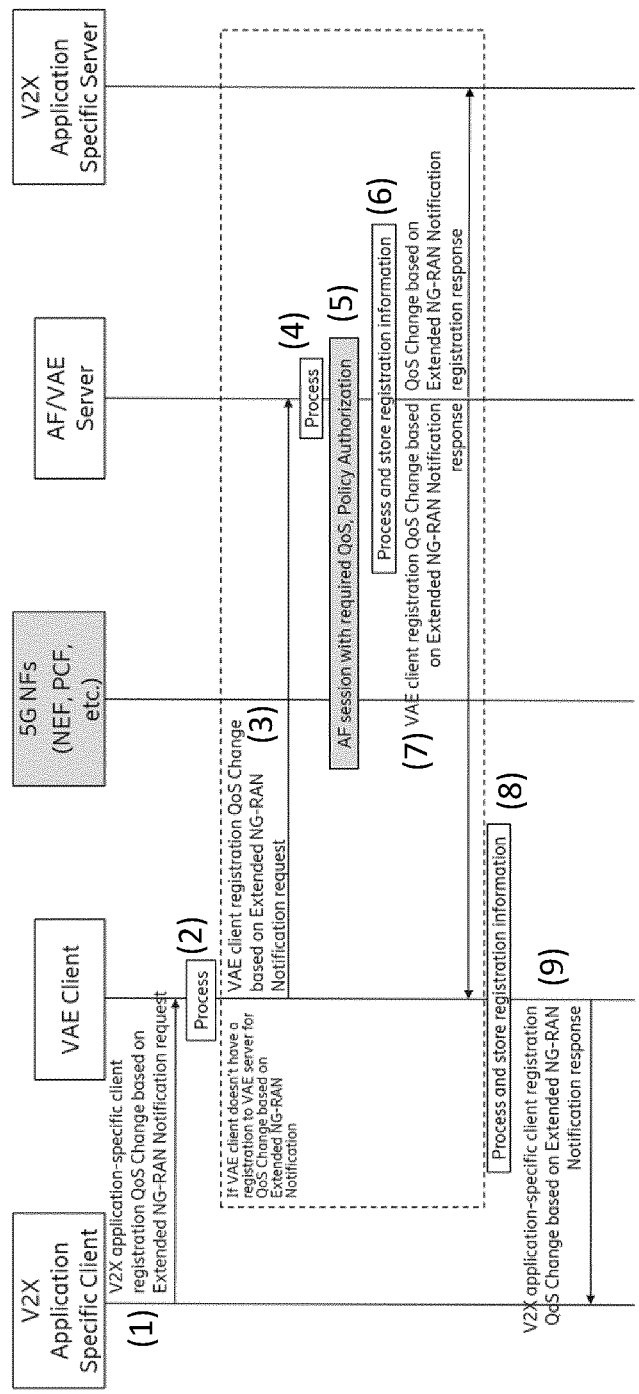
FIG. 10 shows a flow diagram illustrating an exemplary procedure for Client registration to QoS Change based on Extended NG-RAN Notification, according to various exemplary embodiments of the present disclosure.

FIG. 10 shows a flow diagram illustrating an exemplary procedure for Client registration to QoS Change based on Extended NG-RAN Notification, according to these exemplary embodiments. Various operations in FIG. 10 are given numerical labels. Unless expressly stated to the contrary, however, these numerical labels are not intended as a strict order of the operations in FIG. 10, but merely are used to facilitate the following explanation of such operations.

In operation 1, a V2X application-specific client (i.e., in the device) uses the V2X_Application_Specific_Client_Registration_QoS_Change_based_on_Extended_NG-RAN_Notification API to send a V2X application-specific client registration QoS Change based on Extended NG-RAN Notification request to the VAE client (i.e., in the device). The request can include, but is not limited to, the following information:

V2X application-specific client ID. ID of the V2X application-specific client for receiving QoS Change based on Extended NG-RAN Notification.

V2X application-specific server ID. If included, it indicates whether QoS Change based on Extended NG-RAN Notification should be notified to V2X application-specific server in addition to the V2X application-specific client. The V2X application-specific client can also indicate whether the V2X application-specific server should receive the same notification as the V2X application-specific client (i.e., the same information) or only an information that a notification towards the V2X application-specific client has been sent.

V2X service ID. If included, it indicates the V2X service ID for which the V2X application-specific client registers to receive notifications.

GEO ID. The geographical area to which the V2X application-specific client registers to.

Alternative Service Requirements. QoS reference parameters in a prioritized order (more information can be found in TS 23.503).

Application flow description (explicit or implicit): This information helps the network to identify the application specific traffic flow in the network. This may be an SNI or a 5-Tuple. When the VAE client is managing the transport connections (Layer 4) on behalf of the application-specific client, then only a hint or a flag may be present and the VAE client will fill in the detailed information.

In operation 2, the VAE client processes the request received from the V2X application-specific client. For example, the VAE client can check whether the VAE client has an already information about the support of Extended NG-RAN Notification. For example, the VAE client may have information that the Extended NG-RAN Notification is not supported in geographical area associated to the GEO ID included in the request. In this case, the VAE client doesn't contact the VAE server and moves directly to the final processing before sending a response to the V2X application-specific client.

In operation 3, if necessary, the VAE client uses the VAE client registration QoS Change based on Extended NG-RAN Notification procedure to send a VAE client registration QoS Change based on Extended NG-RAN Notification request to the relevant VAE server. The VAE client may perform a translation of information from the request received by the V2X application-specific client before sending the request to the VAE server (e.g., translation of GEO ID or translation of Alternative Service Requirements). Note that in general, the procedure for VAE client registration QoS Change based on Extended NG-RAN Notification of the VAE client to VAE server can be independent of a request received by a V2X application-specific client. In other words, a VAE client may perform the procedure VAE client registration QoS Change based on Extended NG-RAN Notification without this being triggered by a request of a V2X application-specific client.

In operation 4, the VAE server processes the request received by the VAE client. The processing considers, for instance, checking whether the VAE server has an already active registration to the VAE server for QoS Change based on Extended NG-RAN Notification which matches the information included in the request. In this case, the VAE server doesn't trigger the request/subscription to QoS Change based on Extended NG-RAN Notification towards the relevant functions in the core network and moves directly to the final processing before sending a response to the VAE client.

In operation 5, if the VAE server has to establish a session for which Extended NG-RAN Notification should be required, it invokes the Policy Authorization Service offered by the PCF (as defined in 3GPP TS 23.502, clause 5.2.5.3), either directly or by using the procedure AF session with required QoS (as defined in 3GPP TS 23.503, clause 6.1.3.22). More specifically, it uses the Alternative Service Requirements and the Application flow description included in the request received by the VAE client, adequately translated if needed.

In operation 6, the VAE server performs a final processing taking into account the output of the session establishment with Extended NG-RAN Notification (if required). In case the request from the VAE client can be successfully handled (i.e., session with Extended NG-RAN Notification already active or session with Extended NG-RAN Notification successfully established), the VAE server stores registration information. For example, the VAE server can add the VAE client to the list of VAE clients to whom the QoS Change based on Extended NG-RAN Notification should be provided. If indicated in the request, the VAE server stores also the registration information that QoS Change based on Extended NG-RAN Notification should be provided also to the V2X application-specific server. In this case, based on the field V2X application-specific server ID of the request, the VAE server stores the information whether the VAE server should receive the same notification as the one sent to VAE client (i.e., same content adequately translated) or only the information that a notification towards the VAE client has been triggered.

In operation 7, the VAE server uses the VAE client registration QoS Change based on Extended NG-RAN Notification procedure to send a VAE client registration QoS Change based on Extended NG-RAN Notification response to the VAE client indicating the acceptance/rejection of the request. If indicated in the request, the VAE server sends a QoS Change based on Extended NG-RAN Notification registration response to the relevant V2X application-specific server. In this case, the V2X application-specific server which has to receive the response may be explicitly indicated in the request or it may be that the VAE server has an understanding of which V2X application-specific server to send the response to according to other available information/mapping at the VAE server (e.g., stored relationship between VAE client and V2X application-specific server).

In operation 8, the VAE client performs a final processing taking into account the response from the VAE server, if any. In case the request from the V2X application-specific client can be successfully handled, the VAE client stores registration information. For example, the VAE client can add the V2X application-specific client to the list of V2X application-specific clients to whom the QoS Change based on Extended NG-RAN Notification should be provided.

In operation 9, the VAE client uses the V2X_Application_Specific_Client_Registration_QoS_Change_based_on_Extended_NG-RAN_Notification API to send a V2X application-specific client registration QoS Change based on Extended NG-RAN Notification response to the V2X application-specific client indicating the acceptance/rejection of the request.

In some embodiments, the extensions to the VAE framework shown in FIG. 2 can include a method (e.g., procedure) for Notification on QoS Sustainability Analytics to V2X application-specific client at the device, where a V2X application-specific client receives from a VAE client a Notification on QoS Sustainability Analytics which has been exposed by the 3GPP CN towards the VAE server. Such embodiments can include the following:

A procedure Notification on QoS Sustainability Analytics can be introduced between the VAE server and the VAE client which allows a VAE client to receive Notification on QoS Sustainability Analytics by a VAE server.

The VAE client can be extended with an API V2X_Network_Information_QoS_Notification_QoS_Sustainability_Analytics, used to deliver Notification on QoS Sustainability Analytics to V2X application-specific client.

In some embodiments, these extensions can include a method (e.g., procedure) for Notification on QoS Sustainability Analytics to V2X application-specific server at the backend, where a V2X application-specific server receives from the VAE server a Notification on QoS Sustainability Analytics which has been exposed by the core network. In such embodiments, a VAE server can be extended with an API V2X_Network_Information_QoS_Notification_QoS_Sustainability_Analytics, used to deliver Notification on QoS Sustainability Analytics to V2X application-specific server.

Figure 11:
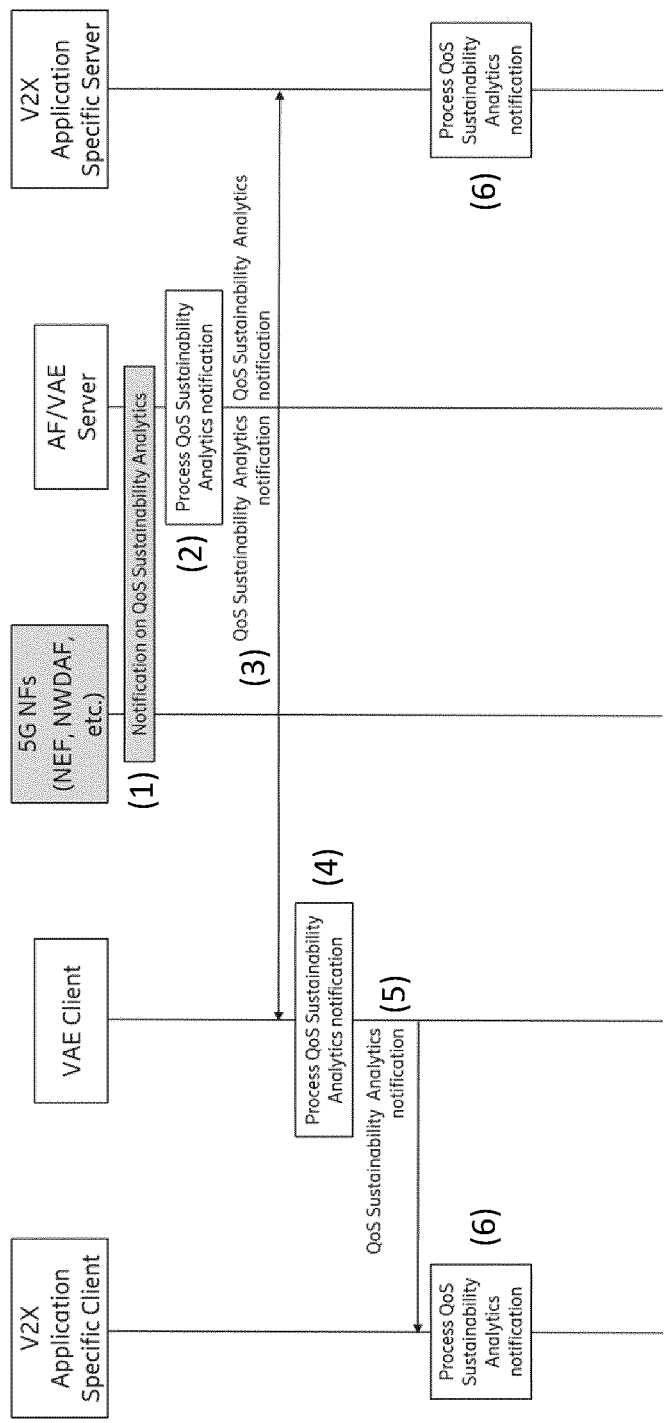
FIG. 11 shows a flow diagram illustrating an exemplary procedure for Notification on QoS Sustainability Analytics to a VAE server and to a VAE client, according to various exemplary embodiments of the present disclosure.

FIG. 11 shows a flow diagram illustrating an exemplary procedure for Notification on QoS Sustainability Analytics to a VAE server and to a VAE client, according to these exemplary embodiments. Various operations in FIG. 11 are given numerical labels. Unless expressly stated to the contrary, however, these numerical labels are not intended as a strict order of the operations in FIG. 11, but merely are used to facilitate the following explanation of such operations.

In operation 1, the VAE server receives a QoS Sustainability Analytics notification from NEF/NWDAF as defined in 3GPP TS 23.288 (clause 6.9.4). In operation 2, the VAE server processes the received QoS Sustainability Analytics notification. For example, the VAE server can check which the consumers are associated with the notification, i.e., which VAE client(s) and V2X application-specific server(s) should receive the notification. Note that in general, multiple VAE clients and multiple V2X application-specific servers can have registered to receive Notification on QoS Sustainability Analytics.

Another example of the processing in operation 2 is checking whether the notification matches the information associated to the request, e.g., checking if the notification can be mapped to the geographical area associated to the GEO ID of the request (for instance, the VAE server has an ongoing subscription to QoS Sustainability Analytics but the request indicates that the notification should be exposed to VAE client or to V2X application-specific server only when referring to certain specific GEO IDs). In any case, after the processing is completed, the VAE server generates the relevant responses and performs the relevant translations of the notification received by NEF/NWDAF according to the associated receivers.

In operation 3, the VAE server provides the notification to subscribed consumers. Considering the different types of consumers, this provisioning can involve the operations listed below. Note, however, the notifications towards the VAE client and towards the V2X application-specific server could be also independent. In other words, a notification can be sent only to V2X application-specific server, only to VAE client, or to both.

For delivering the notification towards the relevant VAE client(s), the VAE server uses the Notification on QoS Sustainability Analytics procedure to send the QoS Sustainability Analytics.

If also the V2X application-specific server has subscribed to the VAE server for receiving QoS Sustainability Analytics notification, such notification is also provided to relevant V2X application-specific server(s) by using the V2X_Network_Information_QoS_ Notification_QoS_Sustainability_Analytics API. In this case, depending on the stored registration information, the VAE server may provide to V2X application-specific server either the same content as provided to VAE client (adequately translated) or simply an information indicating that a QoS Sustainability Analytics notification has been sent to VAE client.

In operation 4, the VAE client processes the received QoS Sustainability Analytics notification. For example, the VAE client can check which V2X application-specific client(s) should receive the notification. Note that in general, multiple V2X application-specific clients can have registered to receive Notification on QoS Sustainability Analytics.

The processing can also include checking whether the notification matches the information associated to the request. For example, the VAE client can check if the notification can be mapped to the geographical area associated to the GEO ID of the request. The VAE client may subscribe to QoS Sustainability Analytics for several geographical areas but the request indicates that the notification should be exposed to V2X application-specific client/server only when referring to certain specific GEO IDs. After the processing, the VAE client generates the relevant responses and performs the relevant translations of the notification received by VAE server according to the associated receivers.

In operation 5, the VAE client uses the V2 X_Network_Information_QoS_Notification_QoS_Sustainability_ Analytics API to send a QoS Sustainability Analytics notification to relevant V2X application-specific client(s).

In operation 6, the V2X application-specific client and the V2X application-specific server process the received QoS Sustainability Analytics notification by VAE client and by VAE server, respectively. The respective processing can include storing the received notification or can also include triggering some adaptation of application's behavior (e.g., data rate, data prioritization, etc.) and/or the associated vehicle's behavior (e.g., speed, path/route, etc.).

In some embodiments, the extensions of the VAE framework shown in FIG. 2 can include a method (e.g., procedure) for QoS Change based on Extended NG-RAN Notification to V2X application-specific client at the device, where a V2X application-specific client receives from the VAE client a QoS Change based on Extended NG-RAN Notification which has been exposed by the 3GPP CN towards the VAE server. Such embodiments can include the following:

A procedure QoS Change based on Extended NG-RAN Notification can be introduced between the VAE server and the VAE client which allows a VAE client to receive QoS Change based on Extended NG-RAN Notification by a VAE server.

The VAE client can be extended with an API V2X_Network_Information_QoS_Notification_QoS_ Change_based_on_Extended_NG-RAN_Notification, used to deliver QoS Change based on Extended NG-RAN Notification to V2X application-specific client.

In some embodiments, these extensions can include a method (e.g., procedure) for QoS Change based on Extended NG-RAN Notification to V2X application-specific server at the backend, where a V2X application-specific server receives from the VAE server a QoS Change based on Extended NG-RAN Notification that has been exposed by the core network. In such embodiments, a VAE server can be extended with an API V2X_Network_Information_ QoS_Notification_QoS_Change_based_on_Extended_NG-RAN_Notification, used to deliver QoS Change based on Extended NG-RAN Notification to V2X application-specific server.

Figure 12:
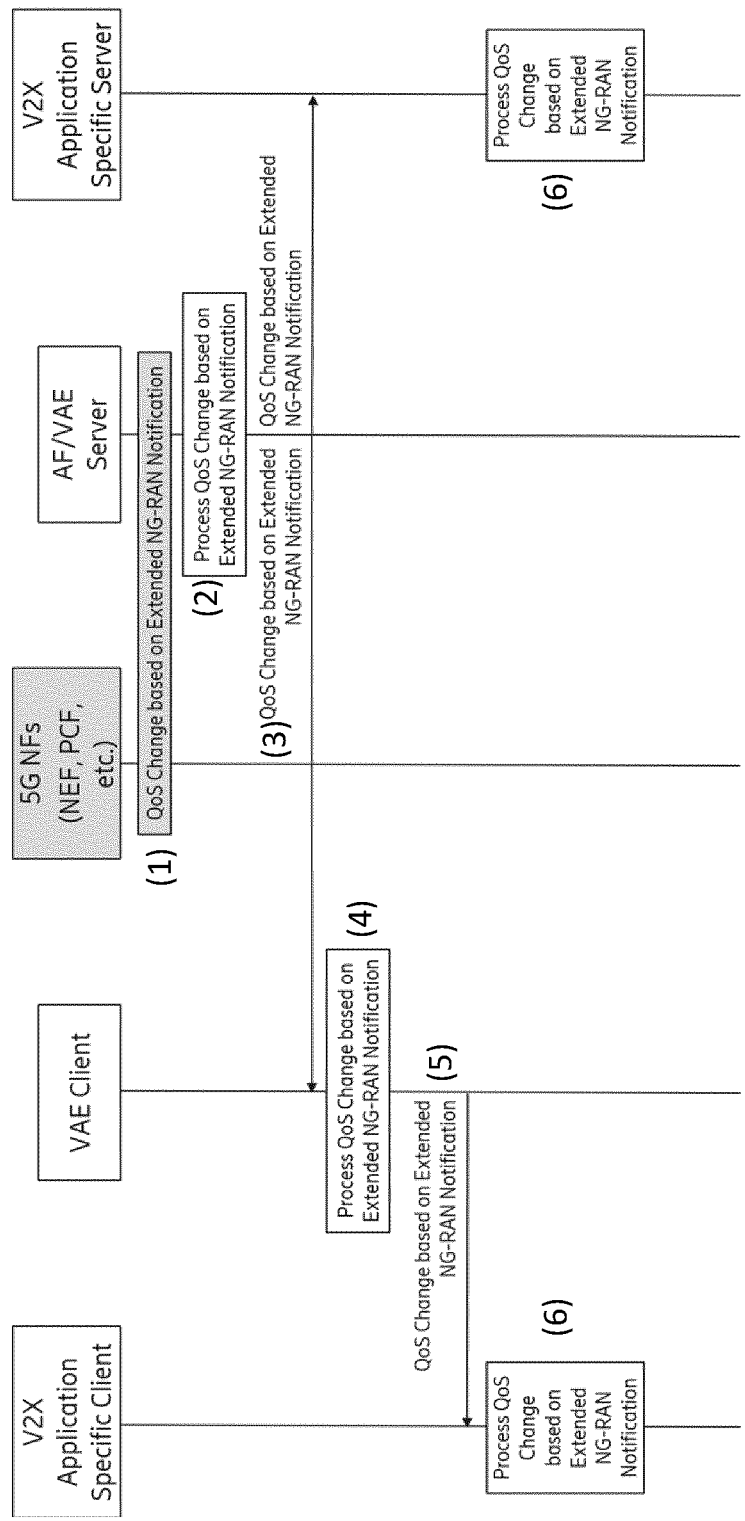
FIG. 12 shows a flow diagram illustrating an exemplary procedure for QoS Change based on Extended NG-RAN Notification to a VAE client and to a VAE server, according to various exemplary embodiments of the present disclosure.

FIG. 12 shows a flow diagram illustrating an exemplary procedure for QoS Change based on Extended NG-RAN Notification to a VAE client and to a VAE server, according to these exemplary embodiments. Various operations in FIG. 12 are given numerical labels. Unless expressly stated to the contrary, however, these numerical labels are not intended as a strict order of the operations in FIG. 11, but merely are used to facilitate the following explanation of such operations.

In operation 1, the VAE server receives a QoS Change based on Extended NG-RAN Notification from NEF/PCF as defined in 3GPP TS 23.287 (clause 5.4.5.3). In operation 2, the VAE server processes the received QoS Change based on Extended NG-RAN Notification. For example, the VAE server can check which consumers are associated with the notification, i.e., which VAE client(s) and V2X application-specific server(s) should receive the notification. Note that in gene multiple VAE clients and multiple V2X application-specific servers can have registered to receive QoS Change based on Extended NG-RAN Notification.

Another example of the processing in operation 2 is checking whether the notification matches the information associated to the request. For example, the VAE server can check if the notification can be mapped to the geographical area associated to the GEO ID of the request. The VAE server can have an ongoing subscription to QoS Change based on Extended NG-RAN Notification but the request indicates that the notification should be exposed to VAE client or to V2X application-specific server only when referring to certain specific GEO IDs. In any case, the VAE server generates the relevant responses and performs the relevant translations of the notification received by NEF/PCF according to the associated receivers.

In operation 3, the VAE server provides the notification to subscribed consumers. Considering the different types of consumers, this provisioning can involve the operations listed below. Note, however, that the notifications towards the VAE client and towards the V2X application-specific server could be also independent. In other words, a notification can be sent only to V2X application-specific server, only to VAE client, or to both.

For delivering the notification towards the relevant VAE client(s), the VAE server uses the QoS Change based on Extended NG-RAN Notification procedure to send the QoS Change based on Extended NG-RAN Notification.

If also the V2X application-specific server has subscribed to the VAE server for receiving QoS Change based on Extended NG-RAN Notification, such notification is also provided to relevant V2X application-specific server(s) by using the V2X_Network_Information_QoS_Notification_QoS_Change_based_on_Extended_NG-RAN_Notification API. In this case, depending on the stored registration information, the VAE server may provide to V2X application-specific server either the same content as provided to VAE client (adequately translated) or simply an information indicating that a QoS Change based on Extended NG-RAN Notification has been sent to VAE client.

In operation 4, the VAE client processes the received QoS Change based on Extended NG-RAN Notification. For example, the VAE client can check which V2X application-specific client(s) should receive the notification. Note that, in general, V2X application-specific clients can have registered to receive QoS Change based on Extended NG-RAN Notification.

The processing in operation 4 can also include checking whether the notification matches the information associated to the request. For example, the VAE client can check if the notification can be mapped to the geographical area associated to the GEO ID of the request. The VAE client may subscribe to QoS Change based on Extended NG-RAN Notification for several geographical areas but the request indicates that the notification should be exposed to V2X application-specific client/server only when referring to certain specific GEO IDs. In any case, the VAE client generates the relevant responses and performs the relevant translations of the notification received by VAE server according to the associated receivers.

In operation 5, the VAE client uses the V2X_Network_Information_QoS_Notification_QoS_Change_based_on_Extended_NG-RAN_Notification API to send a QoS Change based on Extended NG-RAN Notification to relevant V2X application-specific client(s). In operation 6, the V2X application-specific client and the V2X application-specific server process the QoS Change based on Extended NG-RAN Notification received from VAE client and from VAE server, respectively. The processing can include storing the received notification and can also include some adaptation of application's behavior (e.g., data rate, data prioritization, etc.) and/or vehicle's behavior (speed, path/route, etc.).

These embodiments described above can be further illustrated with reference to FIGS. 13-14, which depicts exemplary methods (e.g., procedures) performed by a user equipment (UE) and a VAE server, respectively. Put differently, various features of operations described below correspond to various aspects of embodiments described above.

Figure 13:
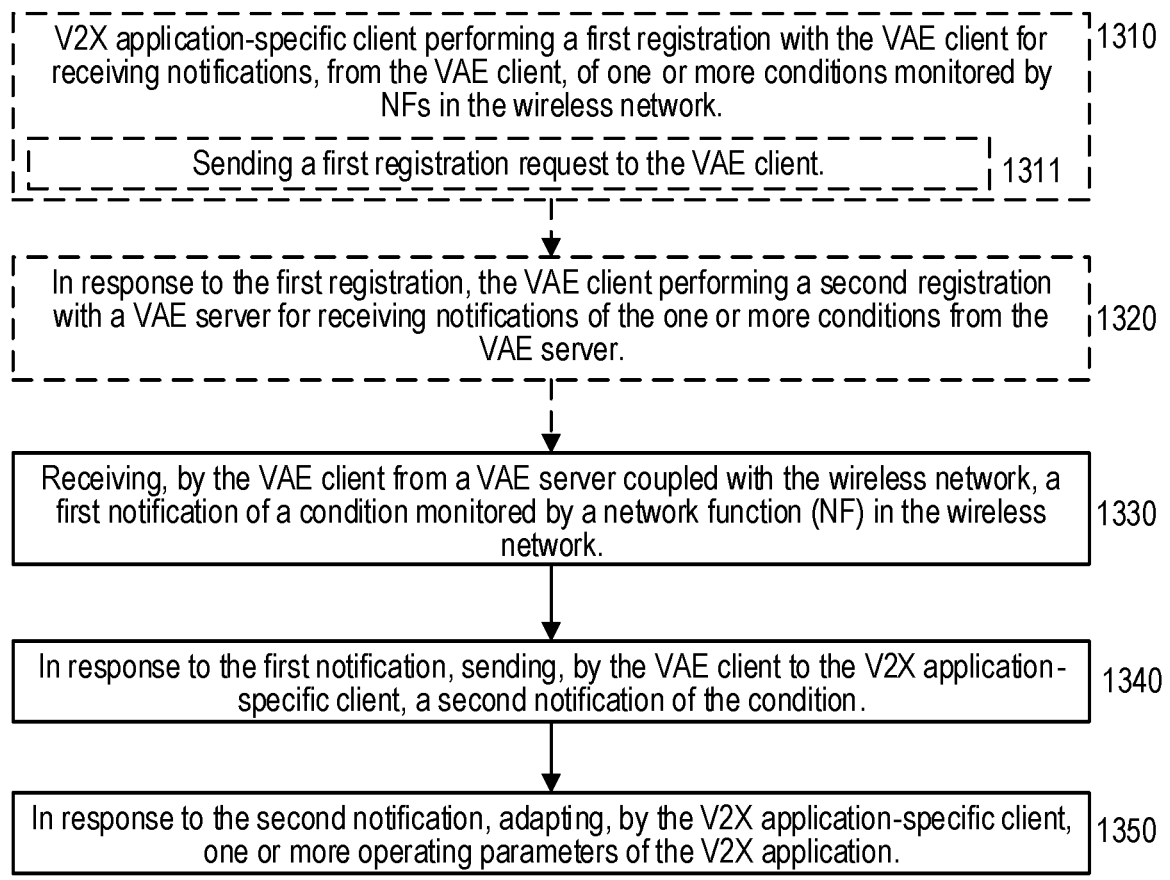
FIG. 13 is a flow diagram illustrating an exemplary method (e.g., procedure) performed by a user equipment (UE, e.g., wireless device), according to various exemplary embodiments of the present disclosure.

More specifically, FIG. 13 illustrates an exemplary method (e.g., procedure) for receiving notifications of conditions occurring in a wireless network, in accordance with particular exemplary embodiments of the present disclosure. The exemplary method shown in FIG. 13 can be performed by a V2X UE (e.g., wireless device) that includes a vehicle-to-everything (V2X) application enabler (VAE) client and a V2X application-specific client associated with a V2X application, as described in relation to other figures herein. Furthermore, the exemplary method is complementary to other exemplary methods described herein (e.g., FIG. 14) such that they can be used cooperatively to provide various features, benefits, and/or solutions to problems described herein. Although the exemplary method is illustrated in FIG. 13 by specific blocks in a particular order, the operations corresponding to the blocks can be performed in different orders than shown and can be combined and/or divided into blocks having different functionality than shown. Optional blocks and/or operations are indicated by dashed lines.

In some embodiments, the exemplary method can include the operations of block 1310, where the V2X application-specific client in the UE can perform a first registration with the VAE client in the UE for receiving notifications, from the VAE client, of one or more conditions monitored by a NF in the wireless network. For example, the operations of block 1310 can correspond to operations 1 and 2 of FIG. 9 or 10, discussed above. For example, the one or more conditions can be related to QoS provided by the network in a particular geographic area and/or in a particular time window, and the NF can be a NWDAF.

In some embodiments, performing the first registration (in block 1310) can include the operations of sub-block 1311, where the V2X application-specific client can send a first registration that includes various information, including any of the following:
an identity (ID) of the V2X application-specific client;
an ID of a V2X application-specific server to which notifications of the one or more conditions should be sent;
a V2X service ID;
an ID of a geographical area for which the notification of the one or more conditions is requested;
alternative quality-of-service (QoS) parameters for the V2X application; and
application flow description associated with data traffic for the V2X application in the wireless network.

In such embodiments, the exemplary method can also include the operations of block 1320, where in response to the first registration, the VAE client can perform a second registration with a VAE server, coupled with the wireless network, for receiving notifications of the one or more conditions from the VAE server. For example, the operations of block 1320 can correspond to various ones of operations 3-8 in FIG. 9 or 10.

The exemplary method can also include the operations of block 1330, where the UE's VAE client can receive, from the VAE server, a first notification of a condition monitored by the NF. In other words, after having previously registered for such notifications (e.g., in block 1320), the VAE client can receive a notification of a particular occurrence of the condition after the NF monitoring detects the occurrence. For example, the operations of block 1330 can correspond to operation 3 in FIG. 11 or 12.

The exemplary method can also include the operations of block 1340, where the UE's VAE client can, in response to the first notification, send a second notification of the condition to the UE's V2X application-specific client. In other words, after having previously registered for such notifications (e.g., in block 1310), the V2X application-specific client can receive a notification of a particular occurrence of the condition after VAE client receives such a notification (e.g., in block 1330). For example, the operations of block 1340 can correspond to operations 4-5 in FIG. 11 or 12.

The exemplary method can also include the operations of block 1350, where the UE's V2X application-specific client can, in response to the second notification, adapt one or more operating parameters of the V2X application. For example, this can include adaptation of application's behavior (e.g., data rate, data prioritization, etc.) and/or behavior of a vehicle (speed, path/route, etc.) that the V2X UE is associated with. For example, the operations of block 1350 can correspond to operation 6 in FIG. 11 or 12.

In some embodiments, the wireless network can include a 5G core network (5GC) and a next-generation radio access network (NG-RAN). In such embodiments, the first/second notifications can be one of the following: a QoS Change based on Extended NG-RAN Notification, and a Notification on QoS Sustainability Analytics.

Figure 14:
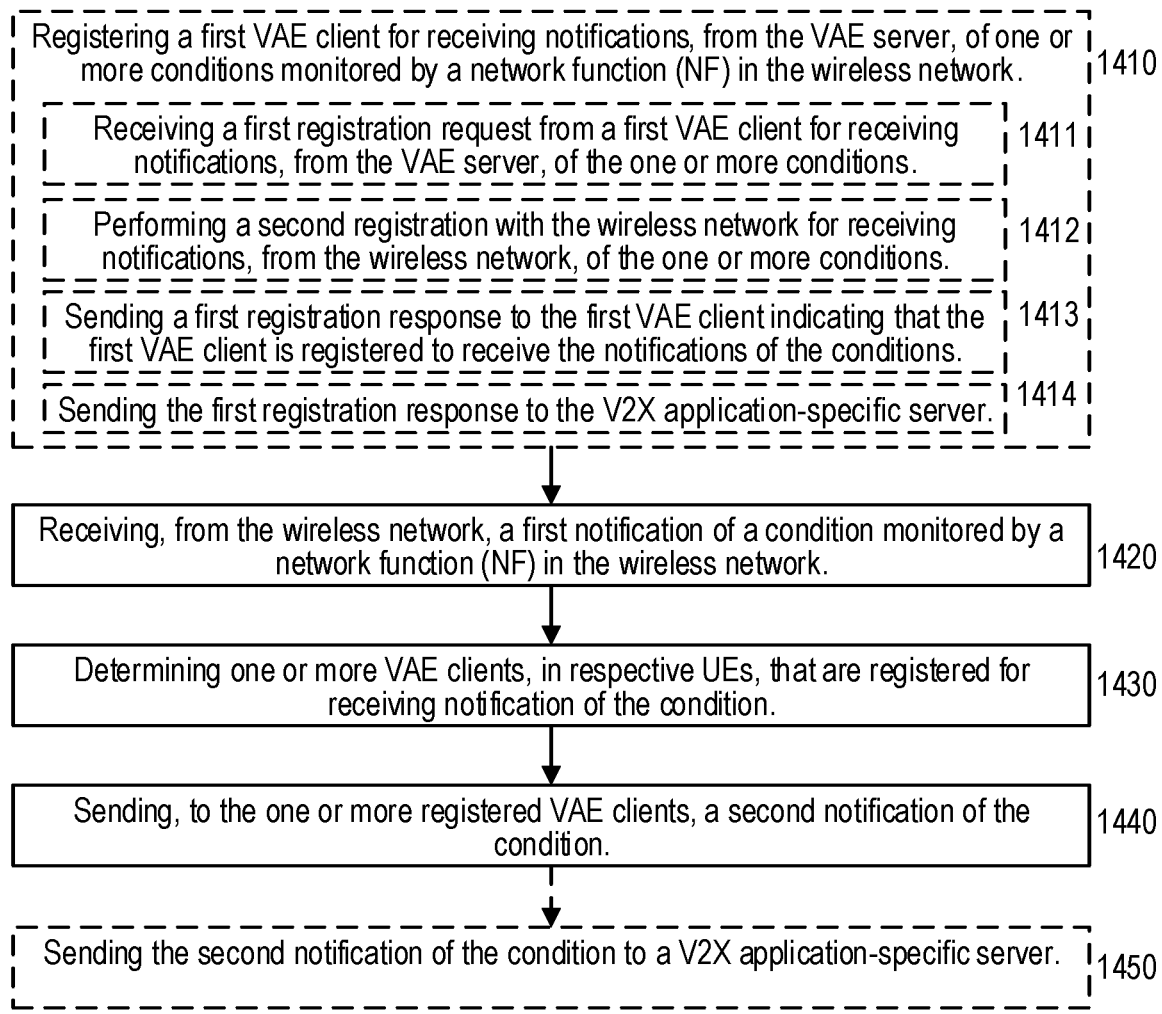
FIG. 14 is a flow diagram illustrating an exemplary method (e.g., procedure) performed by a V2X application enabler (VAE) server, according to various exemplary embodiments of the present disclosure.

In addition, FIG. 14 illustrates an exemplary method (e.g., procedure) for notifying one or more VAE clients in respective user equipment (UEs) of conditions occurring in a wireless network, in accordance with particular exemplary embodiments of the present disclosure. The exemplary method shown in FIG. 14 can be performed by a VAE server associated with the one or more VAE clients, as described in relation to other figures herein. Furthermore, the exemplary method is complementary to other exemplary methods described herein (e.g., FIG. 13) such that they can be used cooperatively to provide various features, benefits, and/or solutions to problems described herein. Although the exemplary method is illustrated in FIG. 14 by specific blocks in a particular order, the operations corresponding to the blocks can be performed in different orders than shown and can be combined and/or divided into blocks having different functionality than shown. Optional blocks and/or operations are indicated by dashed lines.

In some embodiments, the exemplary method can include the operations of block 1410, where the VAE server can register a first one of the VAE clients to receive notifications, from the VAE server, of one or more conditions monitored by a network function (NF) in the wireless network. For example, the one or more conditions can be related to QoS provided by the network in a particular geographic area and/or in a particular time window. For example, the NF can be a NWDAF.

The registering operations of block 1410 can include the operations of sub-blocks 1411-1413. In sub-block 1411, the VAE server can receive a first registration request from the first VAE client for receiving notifications, from the VAE server, of the one or more conditions. For example, this can correspond to operation 3 in FIG. 9 or 10. In sub-block 1412, the VAE server can perform a second registration with the wireless network for receiving notifications, from the wireless network, of the one or more conditions. For example, this can correspond to operation 5 in FIG. 9 or 10. In sub-block 1413, the VAE server can send a first registration response to the first VAE client indicating that the first VAE client is registered to receive the notifications of the one or more conditions. For example, this can correspond to operation 7 in FIG. 9 or 10.

In some embodiments, the the first registration request can include one or more of the following:
- an identity (ID) of a first V2X application-specific client associated with the first VAE client;
- an ID of a V2X application-specific server to which notifications of the one or more conditions should be sent;
- a V2X service ID;
- an ID of a geographical area for which the notification of the one or more conditions is requested;
- alternative quality-of-service (QoS) parameters for the V2X application; and
- application flow description associated with data traffic for the V2X application in the wireless network.

In some of these embodiments, where the the first registration request includes the ID of the V2X application-specific server, the registering operations in block 1410 can also include the operations of sub-block 1414, where the VAE server can send the first registration response to the V2X application-specific server. For example, sending the first response in this manner can be based on the inclusion of the V2X application-specific server ID in the first request.

The exemplary method can also include the operations of block 1420, where the VAE server can receive, from the wireless network, a first notification of a condition monitored by a network function (NF) in the wireless network. For example, this first notification can be received after the VAE server registers (e.g., in sub-block 1412) with the wireless network for receiving notifications of the one or more conditions. For example, this first notification can correspond to operation 1 in FIG. 11 or 12.

The exemplary method can also include the operations of block 1430, where the VAE server can determine one or more VAE clients, in respective UEs, that are registered for receiving notification of the condition. For example, the operations of block 1430 can correspond to operation 2 in FIG. 11 or 12. The exemplary method can also include the operations of block 1440, where the VAE server can send, to the one or more registered VAE clients, a second notification of the condition. For example, the operations of block 1440 can correspond to operation 3 in FIG. 11 or 12.

In some embodiments, the one or more registered VAE clients are associated with respective V2X application-specific clients, and the V2X application-specific clients are associated with a V2X application-specific server. In such embodiments, the exemplary method can also include send the second notification of the condition to the V2X application-specific server. This can be done, for example, if the registered VAE client(s) provided an ID of the V2X application-specific server in the registration request, as discussed above.

In some embodiments, the wireless network can include a 5G core network (5GC) and a next-generation radio access network (NG-RAN). In such embodiments, the second notification can be one of the following: a QoS Change based on Extended NG-RAN Notification, and a Notification on QoS Sustainability Analytics.

Figure 15:
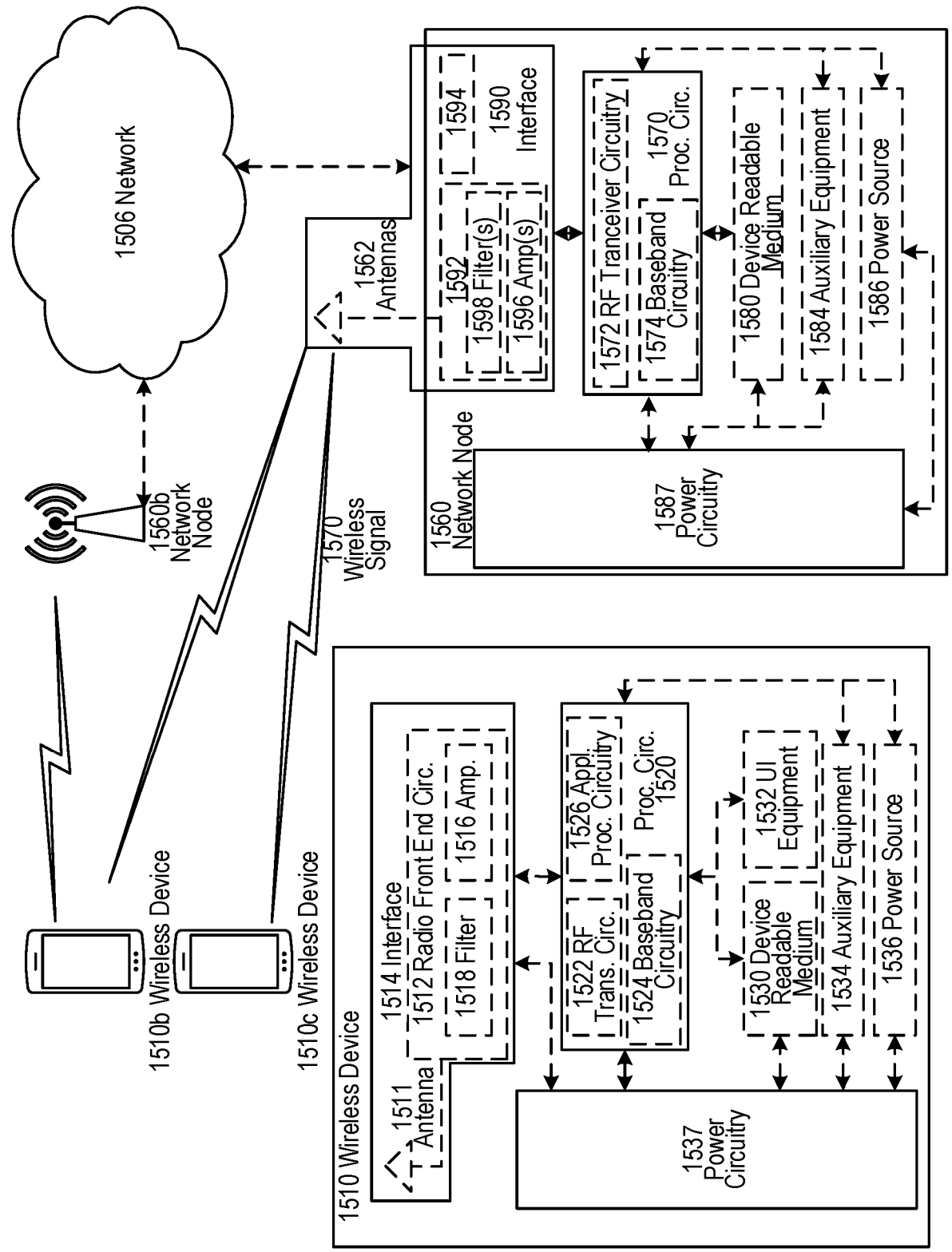
FIG. 15 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node can be a virtual network node as described in more detail below.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and a RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 can execute instructions stored in device readable medium 1580 or in memory within processing circuitry 1570. Such functionality can include providing any of the various wireless features, functions, or benefits discussed herein. In some embodiments, processing circuitry 1570 can include a system on a chip (SOC).

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality can include providing any of the various wireless features or benefits discussed herein. For example, processing circuitry 1520 can execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510, and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network, and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
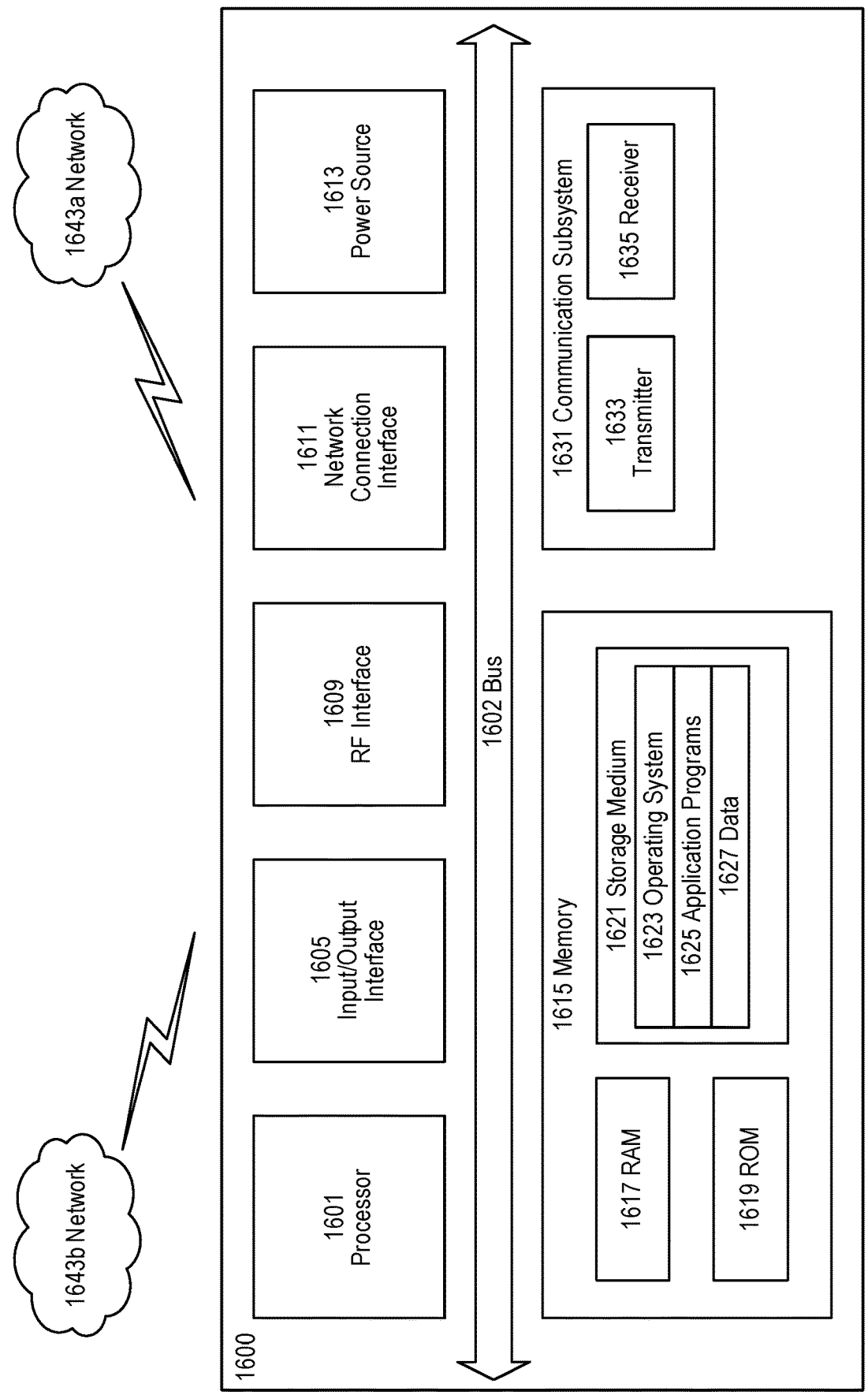
FIG. 16 is a block diagram of an exemplary user equipment (UE) configurable according to various exemplary embodiments of the present disclosure.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 16200 can be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643*a*. Network 1643*a* can encompass wired and/or wireless networks such as a local-area network (LAN), a wide-area network (WAN), a computer network, a wireless network, a telecommunications network, another like network or any combination thereof. For example, network 1643*a* can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 can be configured to include operating system 1623, application program 1625 such as a web browser application, a widget or gadget engine or another application, and data file 1627. Storage medium 1621 can store, for use by UE 1600, any of a variety of various operating systems or combinations of operating systems.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a to communication system can be tangibly embodied in storage medium 1621, which can comprise a device readable medium.

In FIG. 16, processing circuitry 1601 can be configured to communicate with network 1643b using communication subsystem 1631. Network 1643a and network 1643b can be the same network or networks or different network or networks. Communication subsystem 1631 can be configured to include one or more transceivers used to communicate with network 1643b. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643b can encompass wired and/or wireless networks such as a local-area network (LAN), a wide-area network (WAN), a computer network, a wireless network, a telecommunications network, another like network or any combination thereof. For example, network 1643b can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
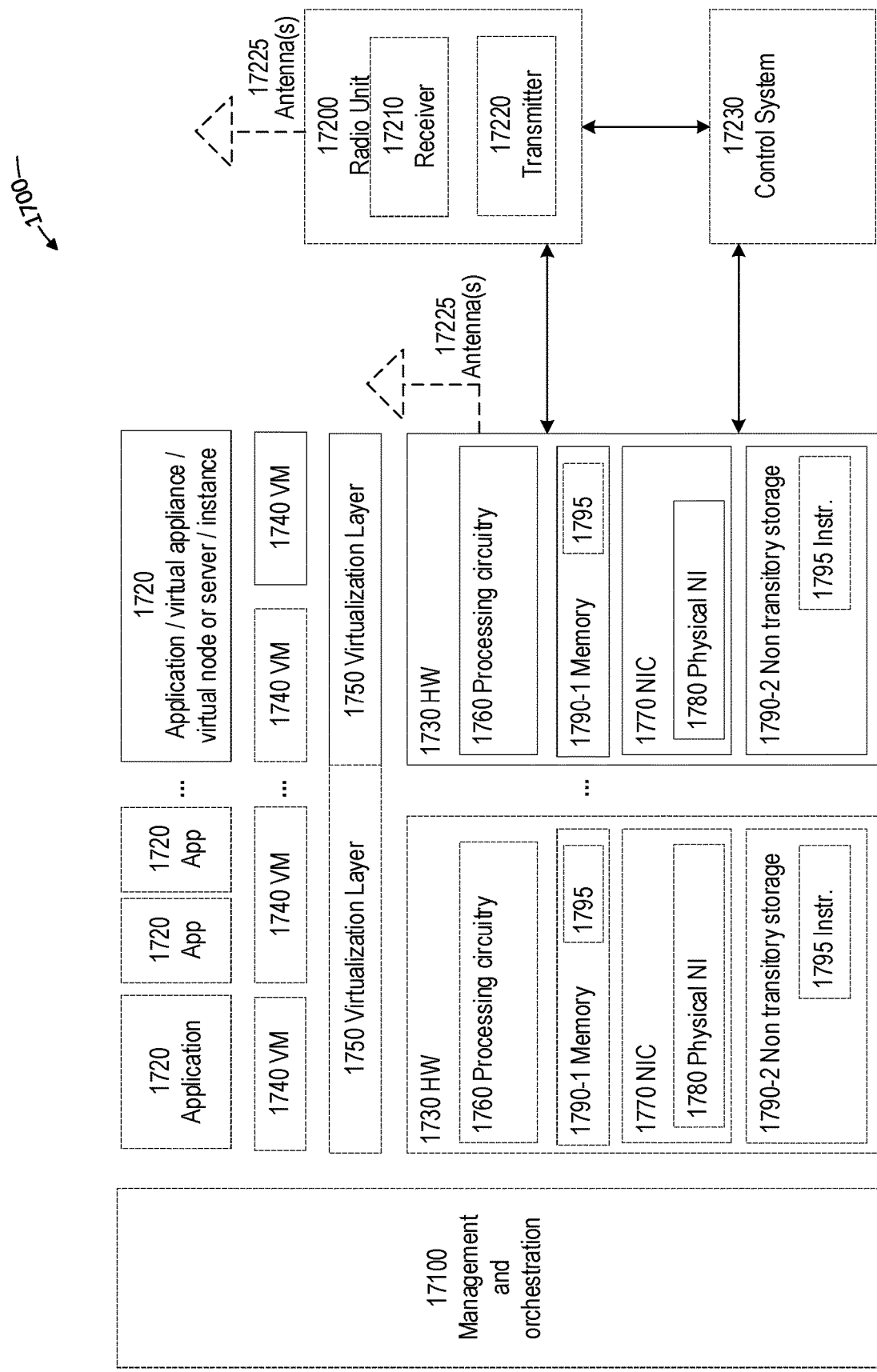
FIG. 17 is a block diagram illustrating a network environment that can facilitate virtualization of various functions implemented according to various exemplary embodiments of the present disclosure.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station.

In some embodiments, some signalling can be effected with the use of control system 17230 which can alternatively be used for communication between the hardware nodes 1730 and radio units 17200.

Figure 18:
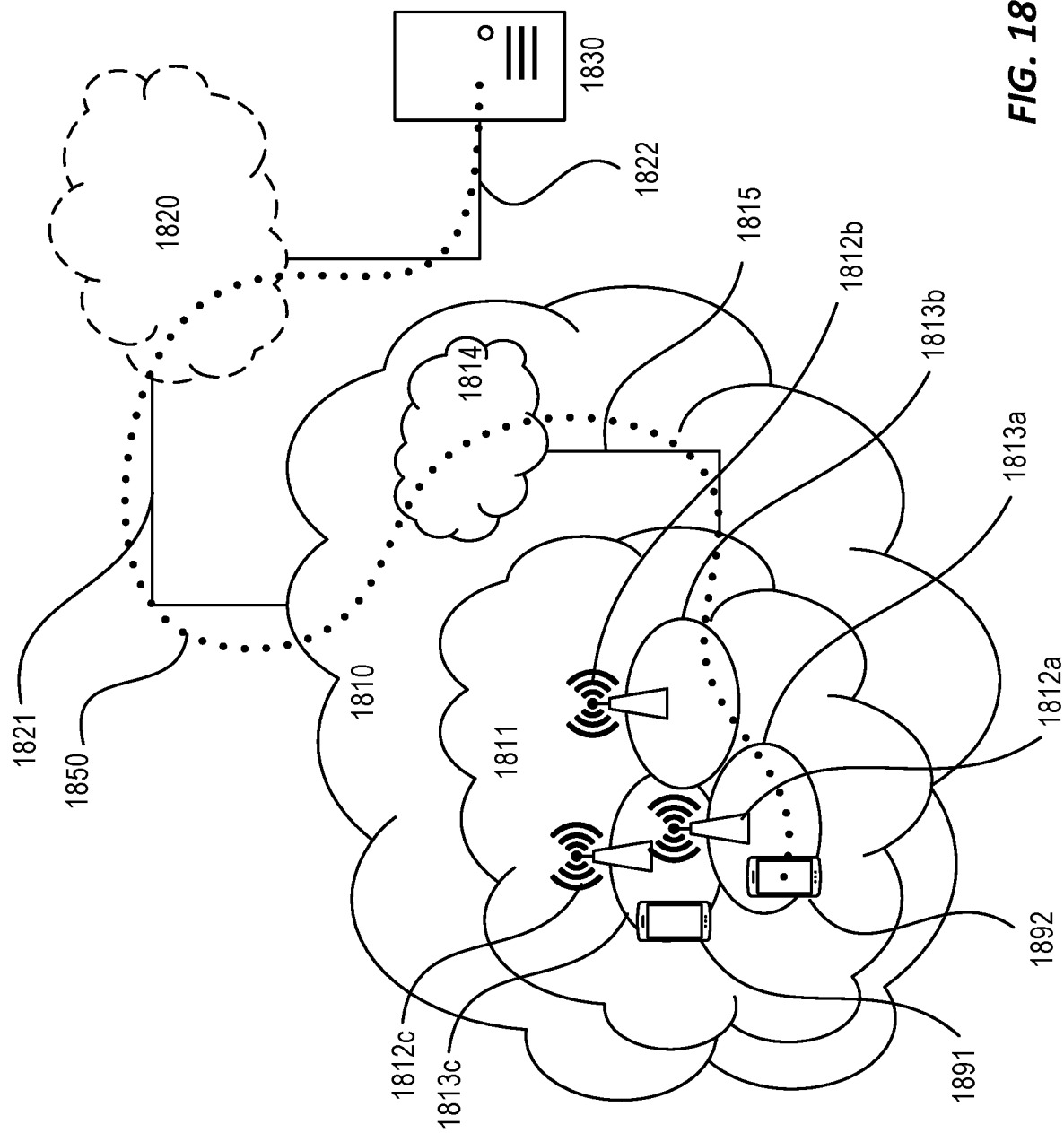
FIGS. 18-19 are block diagrams of various exemplary communication systems and/or networks, according to various exemplary embodiments of the present disclosure.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c can be configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider, or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820 can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 can also include UE 1930 already referred to. Its hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides.

Figure 19:
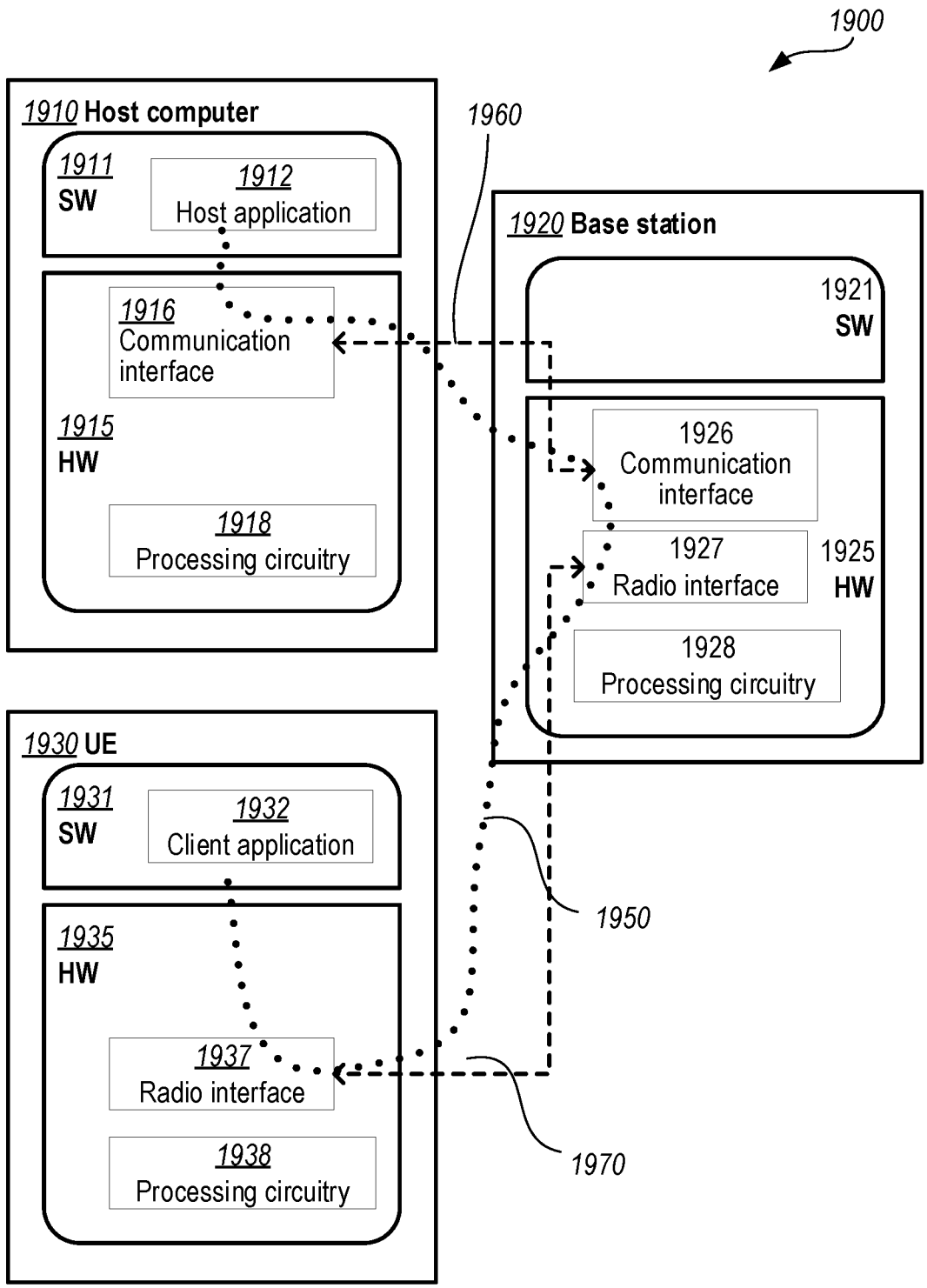

It is noted that host computer 1910, base station 1920 and UE 1930 illustrated in FIG. 19 can be similar or identical to host computer 1830, one of base stations 1812a, 1812b, 1812c and one of UEs 1891, 1892 of FIG. 18, respectively. This is to say, the inner workings of these entities can be as shown in FIG. 19 and independently, the surrounding network topology can be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes; the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors etc.

FIG. 20 is a flowchart illustrating an exemplary method and/or procedure implemented in a communication system, in accordance with one embodiment. The communication system includes a host computer, a base station and a UE which, in some exemplary embodiments, can be those described with reference to FIGS. 18 and 19. For simplicity of the present disclosure, only drawing references to FIG. 20 will be included in this section. In step 2010, the host computer provides user data. In substep 2011 (which can be optional) of step 2010, the host computer provides the user data by executing a host application. In step 2020, the host computer initiates a transmission carrying the user data to the UE. In step 2030 (which can be optional), the base station transmits to the UE the user data which was carried in the transmission that the host computer initiated, in accordance with the teachings of the embodiments described throughout this disclosure. In step 2040 (which can also be optional), the UE executes a client application associated with the host application executed by the host computer.

FIG. 21 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission can pass via the base station, in accordance with the teachings of the embodiments described throughout this disclosure. In step 2130 (which can be optional), the UE receives the user data carried in the transmission.

FIG. 22 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 22 will be included in this section. In step 2210 (which can be optional), the UE receives input data provided by the host computer. Additionally or alternatively, in step 2220, the UE provides user data. In substep 2221 (which can be optional) of step 2220, the UE provides the user data by executing a client application. In substep 2211 (which can be optional) of step 2210, the UE executes a client application which provides the user data in reaction to the received input data provided by the host computer. In providing the user data, the executed client application can further consider user input received from the user. Regardless of the specific manner in which the user data was provided, the UE initiates, in substep 2230 (which can be optional), transmission of the user data to the host computer. In step 2240 of the method, the host computer receives the user data transmitted from the UE, in accordance with the teachings of the embodiments described throughout this disclosure.

FIG. 23 is a flowchart illustrating an exemplary method and/or procedure implemented in a communication system, in accordance with one embodiment. The communication system includes a host computer, a base station and a UE which can be those described with reference to FIGS. 18 and 19. For simplicity of the present disclosure, only drawing references to FIG. 23 will be included in this section. In step 2310 (which can be optional), in accordance with the teachings of the embodiments described throughout this disclosure, the base station receives user data from the UE. In step 2320 (which can be optional), the base station initiates transmission of the received user data to the host computer. In step 2330 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method performed by a user equipment (UE) for receiving notifications of conditions occurring in a wireless network, wherein the UE includes a vehicle-to-everything (V2X) application enabler (VAE) client and a V2X application-specific client associated with a V2X application, wherein the wireless network includes a 5G core network (5GC) and a next-generation radio access network (NG-RAN), wherein the method comprises:
   receiving, by the VAE client from a VAE server coupled with the wireless network, a first notification of a condition monitored by a network data analytics function (NWDAF) in the wireless network, wherein the first notification is one of the following: a QoS Change based on Extended NG-RAN Notification, or a Notification on QoS Sustainability Analytics;
   in response to the first notification, sending, by the VAE client to the V2X application-specific client, a second notification of the condition; and
   in response to the second notification, adapting, by the V2X application-specific client, one or more operating parameters of the V2X application.

2. The method of claim 1, further comprising:
   the V2X application-specific client performing a first registration with the VAE client for receiving notifications, from the VAE client, of one or more conditions monitored by the NWDAF;
   in response to the first registration, the VAE client performing a second registration with a VAE server for receiving notifications of the one or more conditions from the VAE server.

3. The method of claim 2, wherein performing the first registration includes sending a first registration request to the VAE client, the first registration request including one or more of the following:
   an identity (ID) of the V2X application-specific client;
   an ID of a V2X application-specific server to which notifications of the one or more conditions should be sent;
   a V2X service ID;
   an ID of a geographical area for which the notification of the one or more conditions is requested;
   alternative quality-of-service (QOS) parameters for the V2X application; and
   application flow description associated with data traffic for the V2X application in the wireless network.

4. A method performed by a vehicle-to-everything (V2X) application enabler (VAE) server for notifying one or more associated VAE clients in respective user equipment (UEs) of conditions occurring in a wireless network that includes a 5G core network (5GC) and a next-generation radio access network (NG-RAN), the method comprising:
   receiving, from the wireless network, a first notification of a condition monitored by a network data analytics function (NWDAF) in the wireless network;
   determining one or more VAE clients, in respective UEs, that are registered for receiving notification of the condition, wherein:
      the one or more registered VAE clients are associated with respective V2X application-specific clients, and the V2X application-specific clients are associated with a V2X application-specific server; and
   sending a second notification of the condition to the one or more registered VAE clients and to the V2X application-specific server, wherein the second notification is one of the following: a QoS Change based on Extended NG-RAN Notification, or a Notification on QoS Sustainability Analytics.

5. The method of claim 4, further comprising registering a first one of the VAE clients to receive notifications of one or more conditions from the VAE server, based on:
   receiving from the first VAE client a first registration request for receiving notifications from the VAE server of the one or more conditions;
   performing a second registration with the wireless network for receiving notifications from the wireless network of the one or more conditions; and
   sending a first registration response to the first VAE client indicating that the first VAE client is registered for receiving the notifications of the one or more conditions.

6. The method of claim 5, wherein the first registration request includes one or more of the following:
   an identity (ID) of a first V2X application-specific client associated with the first VAE client;
   an ID of a V2X application-specific server to which notifications of the one or more conditions should be sent;
   a V2X service ID;
   an ID of a geographical area for which the notification of the one or more conditions is requested;
   alternative quality-of-service (QOS) parameters for the V2X application; and
   application flow description associated with data traffic for the V2X application in the wireless network.

7. The method of claim 6, wherein:
   the first registration request includes the ID of the V2X application-specific server; and
   registering the first VAE client further comprises sending the first registration response to the V2X application-specific server.

8. A user equipment (UE) configured to receive notifications of conditions occurring in a wireless network that includes a 5G core network (5GC) and a next-generation radio access network (NG-RAN), the UE comprising:
   radio interface circuitry configured to communicate with the wireless network;
   non-transitory, computer-readable medium storing program instructions including a vehicle-to-everything (V2X) application enabler (VAE) client and a V2X application-specific client associated with a V2X application; and
   processing circuitry configured to execute the program instructions, whereby the UE is configured to:
      receive, by the VAE client from a VAE server coupled to the wireless network, a first notification of a condition monitored by a network data analytics function (NWDAF) in the wireless network, wherein the first notification is one of the following: a QoS Change based on Extended NG-RAN Notification, or a Notification on QoS Sustainability Analytics;
      in response to the first notification, send, by the VAE client to the V2X application-specific client, a second notification of the condition; and
      in response to the second notification, adapt, by the V2X application-specific client, one or more operating parameters of the V2X application.

9. The UE of claim 8, wherein execution of the program instructions by the processing circuitry further configures:
   the V2X application-specific client to perform a first registration with the VAE client for receiving notifications, from the VAE client, of one or more conditions monitored by the NWDAF; and the VAE client to perform, in response to the first registration, a second registration with a VAE server for receiving notifications of the one or more conditions from the VAE server.

10. The UE of claim 9, wherein execution of the program instructions by the processing circuitry further configures the V2X application-specific client to perform the first registration by sending to the VAE client a first registration request that includes one or more of the following:

an identity (ID) of the V2X application-specific client;
an ID of a V2X application-specific server to which notifications of the one or more conditions should be sent;
a V2X service ID;
an ID of a geographical area for which the notification of the one or more conditions is requested;
alternative quality-of-service (QOS) parameters for the V2X application; and
application flow description associated with data traffic for the V2X application in the wireless network.

11. A vehicle-to-everything (V2X) application enabler (VAE) server configured to notify one or more associated VAE clients in respective user equipment (UEs) of conditions occurring in a wireless network that includes a 5G core network (5GC) and a next-generation radio access network (NG-RAN), the VAE server comprising:

communication interface circuitry configured to communicate with the wireless network and with the UEs via the wireless network; and
processing circuitry operably coupled with the communication interface circuitry,
whereby the processing circuitry and the communication interface circuitry are configured to:
receive, from the wireless network, a first notification of a condition monitored by a network data analytics function (NWDAF) in the wireless network;
determine one or more VAE clients, in respective UEs, that are registered for receiving notification of the condition, wherein:
the one or more registered VAE clients are associated with respective V2X application-specific clients, and
the V2X application-specific clients are associated with a V2X application-specific server; and
send a second notification of the condition to the one or more registered VAE clients and to the V2X application-specific server, wherein the second notification is one of the following: a QoS Change based on Extended NG-RAN Notification, or a Notification on QoS Sustainability Analytics.

12. The VAE server of claim 11, wherein the processing circuitry and the communication interface circuitry are further configured to register a first one of the VAE clients to receive notifications of one or more conditions from the VAE server, based on:

receiving from the first VAE client a first registration request for receiving notifications from the VAE server of the one or more conditions;
performing a second registration with the wireless network for receiving notifications from the wireless network of the one or more conditions; and
sending a first registration response to the first VAE client indicating that the first VAE client is registered for receiving the notifications of the one or more conditions.

13. The VAE server of claim 12, wherein the first registration request includes one or more of the following:

an identity (ID) of a first V2X application-specific client associated with the first VAE client;
an ID of a V2X application-specific server to which notifications of the one or more conditions should be sent;
a V2X service ID;
an ID of a geographical area for which the notification of the one or more conditions is requested;
alternative quality-of-service (QOS) parameters for the V2X application; and
application flow description associated with data traffic for the V2X application in the wireless network.

14. The VAE server of claim 13, wherein:

the first registration request includes the ID of the V2X application-specific server; and
registering the first VAE client further comprises sending the first registration response to the V2X application-specific server.

* * * * *

UNITED STATES PATENT AND TRADEMARK OFFICE
CERTIFICATE OF CORRECTION

PATENT NO. : 12,284,579 B2
APPLICATION NO. : 17/766007
DATED : April 22, 2025
INVENTOR(S) : El Essaili et al.

It is certified that error appears in the above-identified patent and that said Letters Patent is hereby corrected as shown below:

On the Title Page

Item (72), under "Inventors", in Column 1, Line 5, delete "Wuerselen (DE)" and insert -- Würselen (DE) --, therefor.

On Page 2, Item (56), under "OTHER PUBLICATIONS", in Column 1, Line 2, delete "Sophio" and insert -- Sophia --, therefor.

In the Drawings

In Fig. 9, Sheet 6 of 17, for Tag "1", Line 2, delete "registrationNotification" and insert -- registration Notification --, therefor.

In Fig. 15, Sheet 12 of 17, for Tag "1572", Line 1, delete "Tranceiver" and insert -- Transceiver --, therefor.

In the Specification

In Column 2, Line 39, delete "respectively" and insert -- respectively. --, therefor.

In Column 3, Line 35, delete "to receiving" and insert -- receiving --, therefor.

In Column 4, Line 61, delete "the the" and insert -- the --, therefor.

In Column 6, Line 51, delete "a a" and insert -- a --, therefor.

In Column 7, Line 7, delete "communicate" and insert -- communicating --, therefor.

In Column 9, Line 34, delete "(MMES)" and insert -- (MMEs) --, therefor.

Signed and Sealed this
Fourteenth Day of October, 2025

John A. Squires
*Director of the United States Patent and Trademark Office*

CERTIFICATE OF CORRECTION (continued)
U.S. Pat. No. 12,284,579 B2

In Column 10, Line 1, delete "such" and insert -- such as --, therefor.

In Column 10, Line 25, delete "includes of" and insert -- includes --, therefor.

In Column 12, Line 55, delete "(e.g," and insert -- (e.g., --, therefor.

In Column 14, Line 6, delete "no" and insert -- not --, therefor.

In Column 14, Line 23, delete "montoring operations that are produced" and insert -- monitoring operations that are produced by --, therefor.

In Column 15, Line 65, delete "(i.e," and insert -- (i.e., --, therefor.

In Column 16, Line 63, delete "genera," and insert -- general, --, therefor.

In Column 21, Lines 8-13, delete "For example, the VAE server can check which the consumers are associated with the notification, i.e., which VAE client(s) and V2X application-specific server(s) should receive the notification. Note that in general, multiple VAE clients and multiple V2X application-specific servers can have registered to receive" and insert -- For example, the VAE server can check which of the consumers are associated with the notification, i.e., which VAE client(s) and V2X application-specific server(s) should receive the notification. Note that in general, multiple VAE clients and multiple V2X application-specific servers can be registered to receive --, therefor.

In Column 22, Line 4, delete "V2 X_" and insert -- V2X_ --, therefor.

In Column 26, Line 6, delete "the the" and insert -- the --, therefor.

In Column 26, Line 20, delete "the the" and insert -- the --, therefor.

In Column 29, Line 23, delete "units" and insert -- units. --, therefor.

In Column 30, Lines 36-37, delete "radio front end circuitry 1590" and insert -- radio front end circuitry 1592 --, therefor.

In Column 31, Line 64, delete "etc.) personal" and insert -- etc.), personal --, therefor.

In Column 32, Line 33, delete "Radio front end circuitry 1514" and insert -- Radio front end circuitry 1512 --, therefor.

In Column 35, Line 12, delete "UE 16200" and insert -- UE 1600 --, therefor.

In Column 35, Line 21, delete "interchangeable." and insert -- interchangeably. --, therefor.

In Column 35, Line 30, delete "power source 1633," and insert -- power source 1613, --, therefor.

CERTIFICATE OF CORRECTION (continued)
U.S. Pat. No. 12,284,579 B2

In Column 37, Line 7, delete "a to" and insert -- a --, therefor.

In Column 38, Line 36, delete "memory 1790. Memory 1790" and insert -- memory 1790-1. Memory 1790-1 --, therefor.

In Column 42, Line 40, delete "host computer 1910's" and insert -- host computer 1910 --, therefor.

In Column 43, Line 32, delete "substep" and insert -- step --, therefor.

In Column 44, Line 28, delete "according" and insert -- according to --, therefor.

In the Claims

In Column 45, Line 45, in Claim 3, delete "(QOS)" and insert -- (QoS) --, therefor.

In Column 46, Line 28, in Claim 6, delete "(QOS)" and insert -- (QoS) --, therefor.

In Column 47, Line 19, in Claim 10, delete "(QOS)" and insert -- (QoS) --, therefor.

In Column 48, Line 34, in Claim 13, delete "(QOS)" and insert -- (QoS) --, therefor.